United States Patent
Midorikawa et al.

(10) Patent No.: US 6,616,186 B1
(45) Date of Patent: Sep. 9, 2003

(54) SEATBELT DEVICE

(75) Inventors: Yukinori Midorikawa, Fujisawa (JP); Hiroshi Yamada, Fujisawa (JP)

(73) Assignee: NSK Autoliv Co., Ltd., Tokyo (JP)

( * ) Notice: Subject to any disclaimer, the term of this patent is extended or adjusted under 35 U.S.C. 154(b) by 0 days.

(21) Appl. No.: 09/657,359

(22) Filed: Sep. 7, 2000

(30) Foreign Application Priority Data

Sep. 10, 1999 (JP) ............................................. 11-257497

(51) Int. Cl.⁷ ................................................. B60R 22/48
(52) U.S. Cl. ..................... 280/801.1; 280/806; 280/735
(58) Field of Search ............................. 280/806, 801.1, 280/807, 735; 180/268; 701/45

(56) References Cited

U.S. PATENT DOCUMENTS

| | | | | |
|---|---|---|---|---|
| 4,573,322 A | * | 3/1986 | Fohl | 280/806 |
| 5,552,986 A | | 9/1996 | Omura et al. | 364/424.05 |
| 5,558,370 A | | 9/1996 | Behr | 280/806 |
| 5,651,564 A | * | 7/1997 | Isaji et al. | 280/806 |
| 5,911,433 A | * | 6/1999 | Swann | 280/806 |
| 6,012,008 A | * | 1/2000 | Scully | 701/45 |
| 6,123,357 A | * | 9/2000 | Hosoda et al. | 280/806 |
| 6,142,524 A | * | 11/2000 | Brown et al. | 280/806 |
| 6,179,330 B1 | * | 1/2001 | Wier | 280/806 |
| 6,213,512 B1 | * | 4/2001 | Swann et al. | 280/806 |

FOREIGN PATENT DOCUMENTS

| | | |
|---|---|---|
| JP | 6-286581 | 10/1994 |
| JP | 10-501500 | 2/1998 |

* cited by examiner

*Primary Examiner*—Brian L. Johnson
*Assistant Examiner*—Christopher Bottorff
(74) *Attorney, Agent, or Firm*—Crowell & Moring LLP

(57) ABSTRACT

A seatbelt device which prevents an occupant from hitting his face against an airbag deploying at the time of a vehicle collision. In order to take up any seatbelt slack before a collision and prevent the occupant from being displaced forward, the seatbelt device comprises a first tension modifier for winding the seatbelt and taking up the seatbelt slack when a collision is predicted, and a second tension modifier for further enhancing the tension of the seatbelt and securing the occupant to the seat at the time of such collision, thereby ensuring that the occupant does not exist in the airbag deployment zone when the airbag is activated.

23 Claims, 28 Drawing Sheets

SEATBELT DEVICE

BACKGROUND OF THE INVENTION

1. Field of the Invention

The present invention relates to a seatbelt device for securing an occupant to a seat with a seatbelt and ensuring the safety of such occupant upon a vehicle collision.

2. Related Art

A known seatbelt device comprises a collision detector for detecting a vehicle collision and outputting a collision signal, an airbag deploying in response to the collision signal, and a seatbelt device having a pretensioner for retracting a seatbelt in response to the collision signal.

However, according to this invention, a large amount of the seatbelt is protracted if, for example, an occupant is wearing clothes made of a thick material. Consequently, the amount of the seatbelt that needs to be wound would be large, because in order to effectively secure an occupant with a seatbelt device having a pretensioner, the seatbelt must have a tension above a prescribed value. If it takes time to effectively secure the occupant after an order for activating the pretensioner is given, the occupant is in the meantime displaced forward in the direction of the collision, entering the zone where the airbag is deploying. In other words, an occupant entering the airbag deployment zone while the airbag is deploying may contact the airbag and hit his/her head against the inflating airbag at the speed of its deployment.

Furthermore, winding of the seatbelt is delayed if the detection of the vehicle collision is delayed, whereby the occupant is displaced in the direction of the collision. Here also, the occupant may be displaced to the airbag deployment zone and hit his/her head against the airbag.

Furthermore, for the safety of the occupant, it is preferred that any vehicle employing a seatbelt device simply in combination with an airbag has its seatbelt device exchanged to a seatbelt device comprising a pretensioner. In such case, a traditional collision detector must also be exchanged to a collision detector capable of driving both an airbag device and a pretensioner, but this increases the number of parts which needs to be exchanged and is also costly.

SUMMARY OF THE INVENTION

A purpose of this invention is to provide a seatbelt device preventing the existence of the occupant's body in the airbag deployment zone.

Another purpose of this invention is to provide a seatbelt device preventing the existence of the occupant's body in the airbag deployment zone, easily replaced with a seatbelt device of a vehicle already equipped with an airbag device.

In order to accomplish the aforementioned purpose, a seatbelt device according to the present invention comprises; a seatbelt fastening detector for detecting that a tongue plate, through which a seatbelt for securing an occupant to a seat passes, has been engaged with a buckle; a collision predictor for predicting a collision of a vehicle and outputting a prediction signal before the collision; a collision detector for detecting the collision of the vehicle and outputting a collision detection signal; an airbag device deploying in response to the output of the collision detection signal; a first tension modifier and a second tension modifier capable of changing the tension of the seatbelt; and a controller for activating the first tension modifier in response to the prediction signal and enhancing the tension of the seatbelt, and activating the second tension modifier in response to the collision detection signal and further enhancing the tension of the seatbelt.

With such structure, if, for example, an occupant is wearing clothes made of a thick material, the first tension modifier is capable of winding before a vehicle collision any additional slack in the seatbelt caused by the thickness of the material, which needs to be wound by a second pretensioner serving as the second tension modifier. Therefore, a low-explosive powder pretensioner may complete the winding of the seatbelt before an inertia force displacing the occupant forward acts on the seatbelt. Thus, the occupant is prevented from being displaced in the direction of the collision further than a permitted range, and would not hit his/her head, etc. against a deploying airbag.

Furthermore, a seatbelt device according to the present invention comprises: a seatbelt fastening detector for detecting that a tongue plate, through which a seatbelt for securing an occupant to a seat passes, has been engaged with a buckle; a collision predictor for predicting a collision of a vehicle and outputting a prediction signal before the collision; a collision detector for detecting the collision of the vehicle and outputting a collision detection signal; an airbag device deploying in response to the output of the collision detection; an airbag activation detector for detecting the activation of the airbag device and outputting an airbag activation signal; a first tension modifier and a second tension modifier capable of changing the tension of the seatbelt; and a controller for activating the first tension modifier in response to the prediction signal and enhancing the tension of the seatbelt, and activating the second tension modifier in response to the collision detection signal and further enhancing the tension of the seatbelt.

With such structure, if a vehicle already equipped with an airbag device but its seatbelt device does not include a pretensioner has its seatbelt exchanged to a seatbelt device having a pretensioner, the traditional collision detector need not be exchanged to a collision detector capable of driving both the airbag and the pretensioner. Exchanging a traditional seatbelt device to a seatbelt device having a pretensioner is relatively easy, and can be done at a low cost.

Preferably, the first tension modifier is a device for winding or protracting the seatbelt by a motor power source, and the second tension modifier is a device for instantly retracting the seatbelt by a power source of powder combustion gas.

Preferably, the airbag activation detector outputs the airbag activation signal when a current supplied to an igniter for operating the airbag exceeds a prescribed current value, or when the temperature of the igniter exceeds a prescribed value.

Preferably, the airbag activation detector outputs the airbag activation signal when any one of currents supplied to a plurality of igniters for operating a plurality of airbags exceeds a prescribed current value, or when any one of the temperatures of the plurality of igniters exceeds a prescribed value.

Preferably, a seatbelt has a seatbelt retractor fixed to either a vehicle body or the seat for winding the seatbelt, and the first tension modifier and the second tension modifier are provided to the seatbelt retractor.

Preferably, a seatbelt device has a seatbelt retractor which is fixed to either a vehicle body or the seat for winding the seatbelt, and the first tension modifier is provided to the seatbelt retractor, and the second tension modifier is provided to the buckle portion.

Preferably, a seatbelt device has a seatbelt retractor which is fixed to either a vehicle body or the seat for winding the seatbelt, and the first tension modifier is provided to the buckle portion and the second tension modifier is provided to the seatbelt retractor, and the seatbelt retractor has a seatbelt locking mechanism for locking the protraction of the seatbelt when the first tension modifier is activated.

Preferably, the first tension modifier is provided to the seatbelt retractor winding one end of the seatbelt, and the second tension modifier is provided to the wrap belt fixing portion fixing the other end of the seatbelt to a vehicle body or the seat.

Preferably, the second tension modifier is provided to the seatbelt retractor winding one end of the seatbelt, the seatbelt retractor has a seatbelt locking mechanism for locking the protraction of the seatbelt when the first tension modifier is activated, and the first tension modifier is provided to the wrap belt fixing portion fixing the other end of the seatbelt to a vehicle body or the seat.

Preferably, the first tension modifier is provided to the buckle portion, and the second tension modifier is provided to a wrap belt fixing portion fixing the other end of the seatbelt to a vehicle body or the seat.

Preferably, the first tension modifier is provided to the wrap belt fixing portion fixing the other end of the seatbelt to a vehicle body or the seat, the second tension modifier is provided to a buckle portion, and the seatbelt retractor fixed to the vehicle body or the seat for winding-the seatbelt has a seatbelt locking mechanism for locking the protraction of the seatbelt in response to an ordering signal.

Preferably, the first tension modifier and the second tension modifier are provided to a wrap belt fixing portion fixing the other end of the seatbelt to a vehicle body or the seat, and the seatbelt retractor fixed to the vehicle body or the seat for winding the seatbelt has a seatbelt locking mechanism for locking the protraction of the seatbelt in response to an ordering signal, Preferably, the seatbelt retractor is provided to the seat. The wrap belt fixing portion is preferably provided to the seat.

DETAILED DESCRIPTION OF THE PREFERRED EMBODIMENTS

DETAILED DESCRIPTION OF THE PREFERRED EMBODIMENTS

Next, the embodiments of the present invention is explained below with reference to the relevant drawings.

Figure 1:
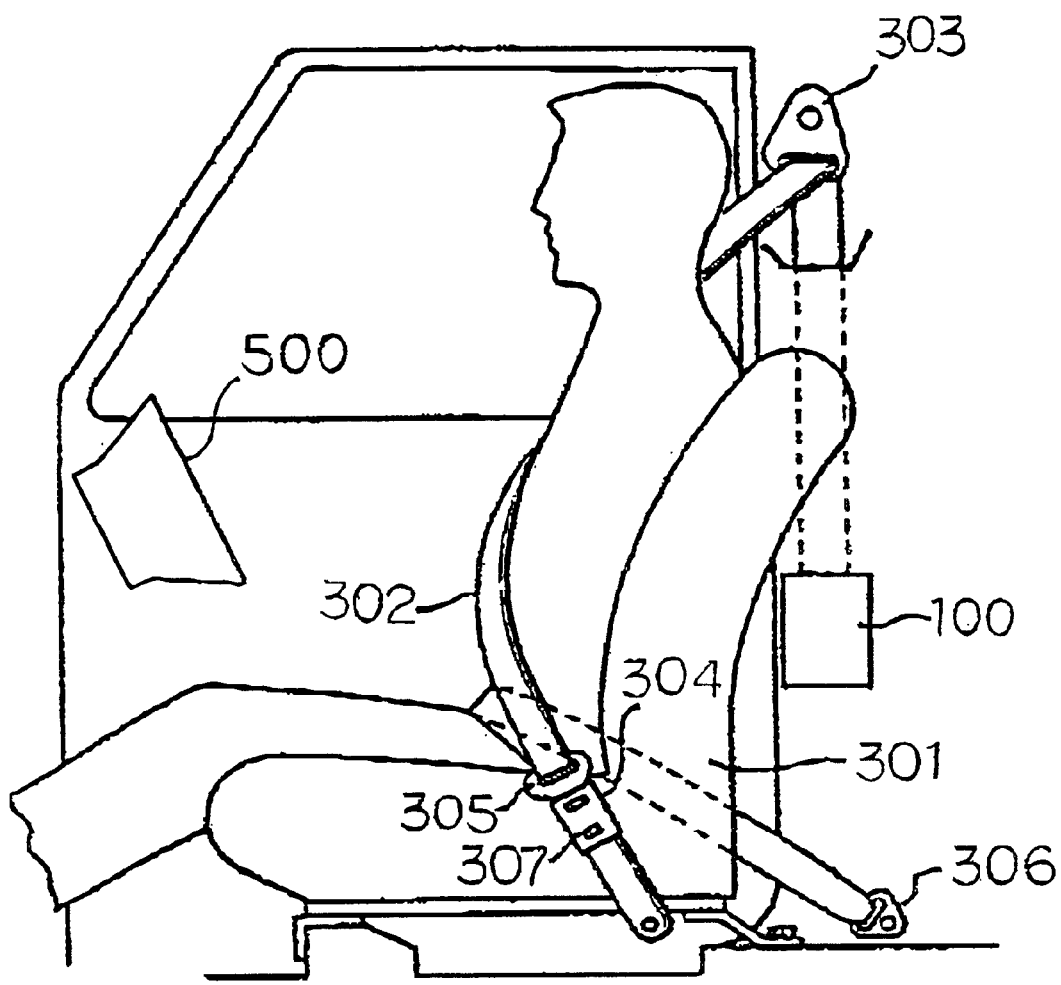
FIG. 1 is a diagram explaining the structure of the seatbelt device.

FIG. 1 shows an example of a seatbelt device provided in a vehicle. The seatbelt device is chiefly structured of: an electric retractor 100 for winding a seatbelt 302 which is used for securing an occupant to a seat 301; a through anchor 303 for folding back the seatbelt 302 in the vicinity of the occupant's shoulder; a tongue plate 305 engaged with a buckle 304 provided at the hip of the occupant, through which the seatbelt passes; an anchor 306 provided at the buckle, fixing an end of the seatbelt 302 to the vehicle; a switch 307 for detecting the fastening of the seatbelt, built in the buckle; a controller 200 (not shown) for controlling a seatbelt retractor 100; a collision predictor 401 (not shown) for predicting a vehicle collision; and a collision detector 402 (not shown). Furthermore, an airbag device 500 is provided at the center portion of the steering wheel. Furthermore, other airbags (not shown) are also provided in the dashboard of the passenger seat and by the doors of the vehicle.

Figure 2:
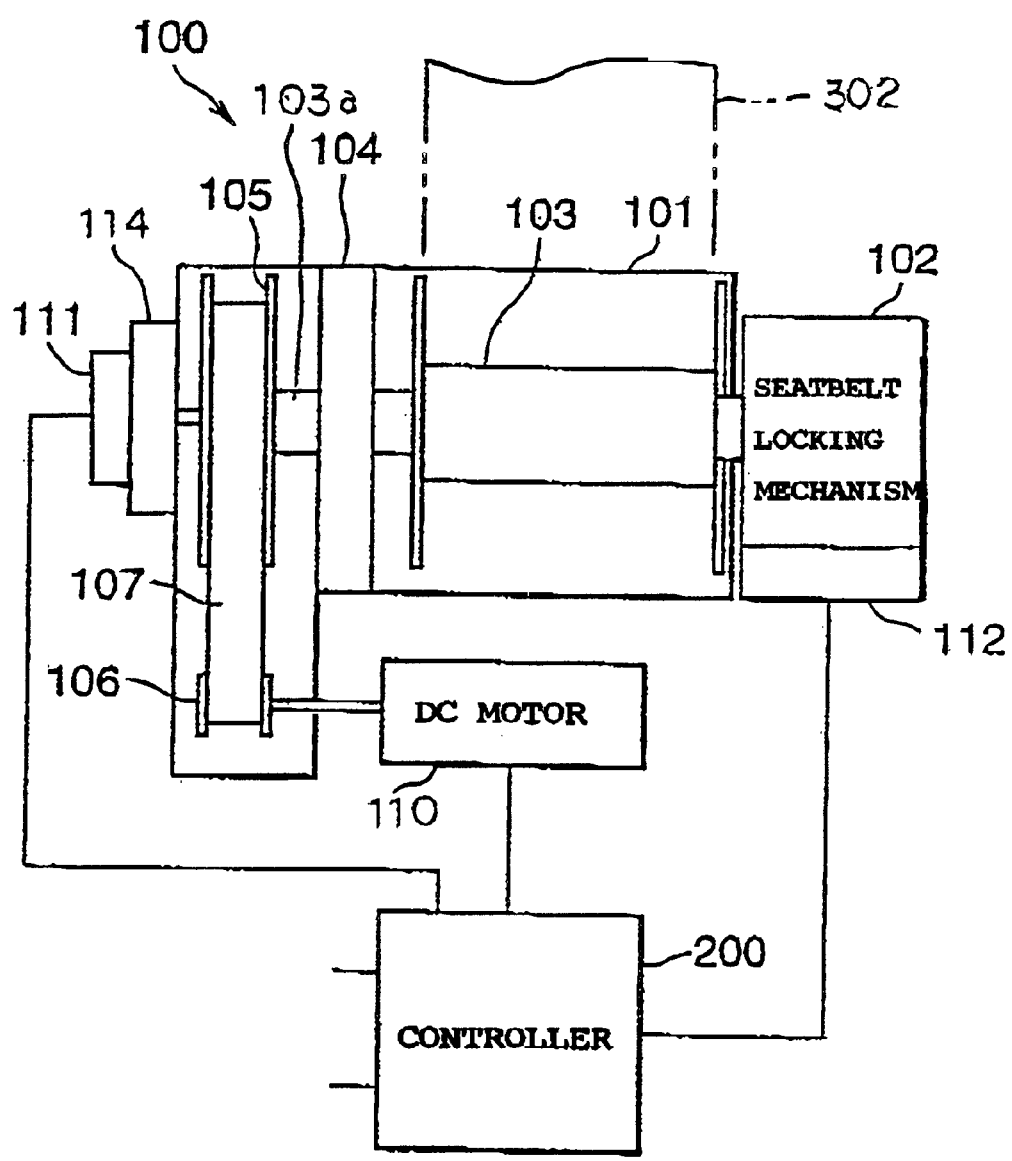
FIG. 2 is a diagram explaining an example of the structure of an electric seatbelt retractor.

FIG. 2 is a diagram roughly explaining the structure of the seatbelt retractor 100. In this Figure, the seatbelt retractor 100 comprises a frame 101. Rotatably provided to the frame 101 are a reel 103 for winding the seatbelt 302, and a reel shaft 103a coupled with the reel 103, which serves as an axis upon the rotation of the reel. Provided at the right end of the reel shaft 103a is a seatbelt locking mechanism 102 (explained below,) for locking the protraction of the seatbelt 302. The seatbelt locking mechanism 102 comprises: a VSI locking mechanism for locking the protraction of the seatbelt when a prescribed deceleration of the vehicle acts on the vehicle; and a WSI locking mechanism for locking the protraction of the seatbelt when the seatbelt 302 is protracted by a prescribed acceleration of the vehicle. Moreover, the seatbelt locking mechanism 102 is further provided with a electromagnetic actuator 112 for performing a compulsory operation of the seatbelt locking mechanism 102 in response to an ordering signal. The operation of the electromagnetic actuator 112 is controlled by the output of the controller 200 explained below. The seatbelt locking mechanism 102 is structured such that an electric motor 110 serving as a first tension modifier may protract the seatbelt 302 even if the winding of the seatbelt 302 is "locked."

A pretensioner 104 constituting a second tension modifier is actuated by the output of the collision detector (not shown), and causes the reel shaft 103a to rotate in the seatbelt winding direction and thereby performs compulsory winding of the seatbelt in order to secure the occupant to the seat. The pretensioner 104 may, for example, be a powder pretensioner, and be chiefly structured of a gas generator, a cylinder for enclosing any gas generated from the gas generator, a piston moving within the cylinder by the pressure of the gas, and a transmission mechanism for converting the movement of the piston to a rotational movement of the reel shaft 103a via a crutch mechanism.

A pulley 105 secured to the reel shaft 103a is connected to a pulley 106 which is fixed to the axis of DC motor 110 via a power transmission belt 107. The pulleys 105 and 106 respectively have a prescribed number of outer teeth formed along the outer peripheries thereof, and seatbelt 107 has a prescribed number of inner teeth formed on the inner periphery thereof. The teeth of the pulley 105 used for the reel shaft and the pulley 106 used for the motor exactly match and mutually bite, and the rotation of the motor 110 is thereby communicated to the reel shaft 103a. The motor 110 is secured at two points or more and is operated by the output of the controller 200.

Figure 3:
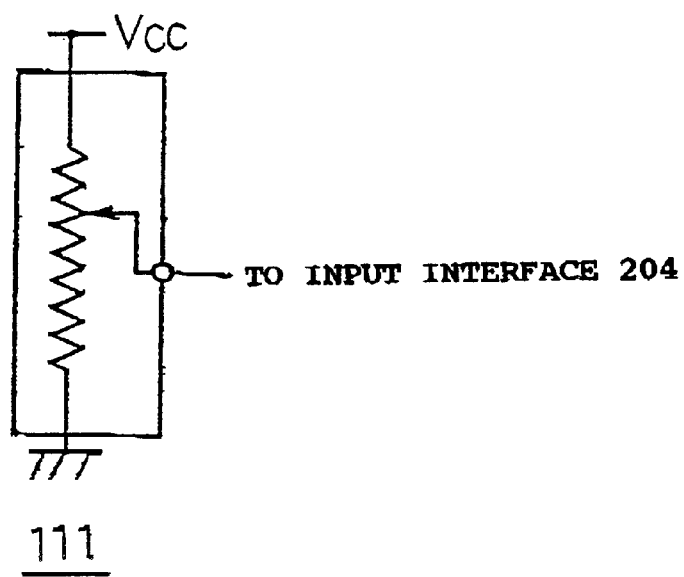
FIG. 3 is a diagram explaining a potentiometer 111.

As shown in FIG. 3, the potentiometer 111 provided at the leftmost end of the reel shaft 103a is chiefly structured of a resister having voltage applied to both of its ends, and a slider which moves together with the rotation of the reel shaft 103a. Furthermore, a voltage value corresponding to the amount of the rotation from the standard position of the reel shaft 103a is output to the controller 200. Thus, the amount of seatbelt protraction, etc. can be estimated. Furthermore, by comparing the voltage under the non-slack state of the seatbelt with that under the protracted state of the seatbelt, the amount of the slack in the seatbelt can be estimated.

Figure 4:
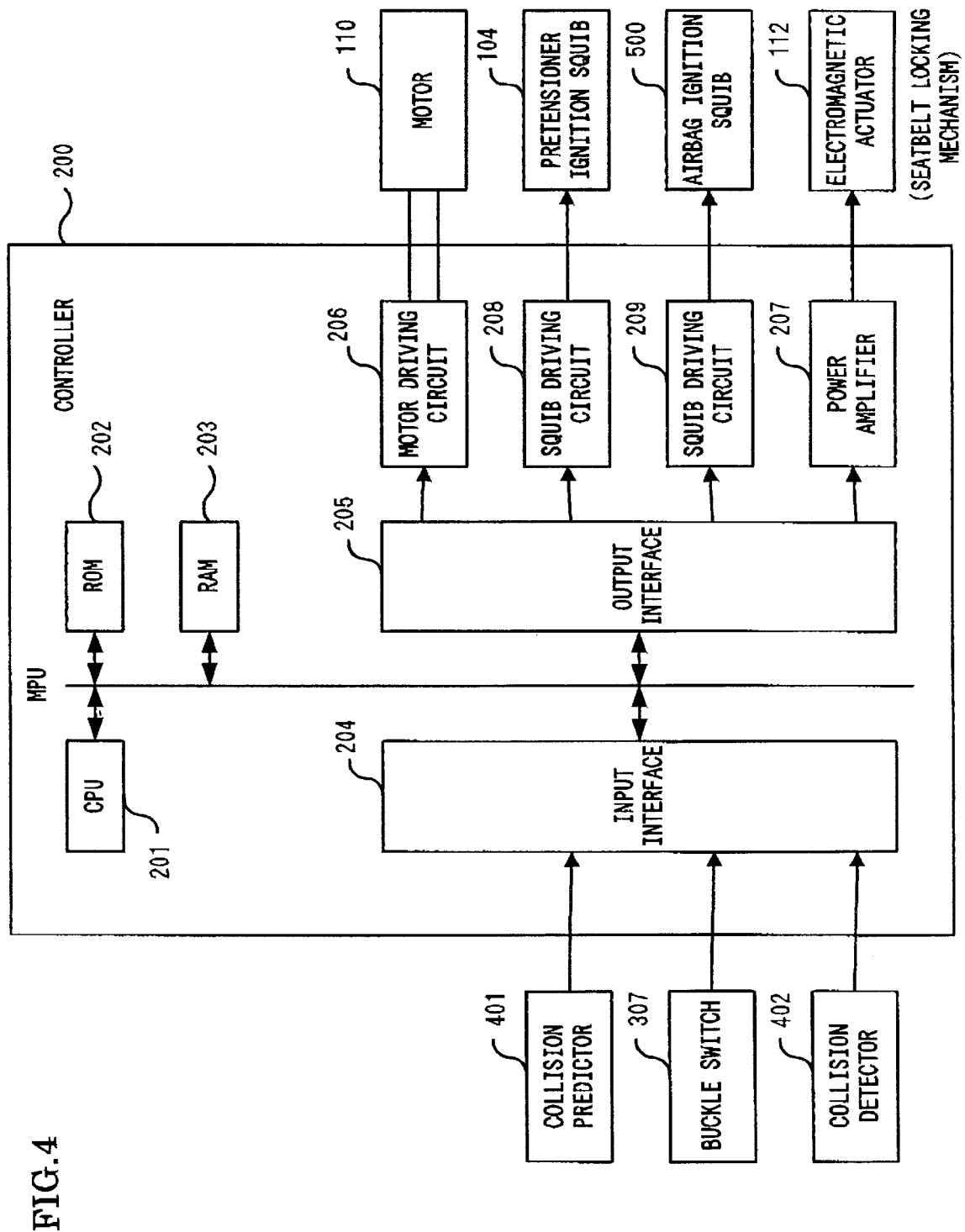
FIG. 4 is a functional block diagram explaining the structure of a controller 200.

FIG. 4 is a functional block diagram explaining the schematic structure of the controller 200. As shown in FIG. 4, the controller 200 is structured as a microcomputer system. A CPU 201 loads to the work area of the RAM 203 the controlling program and the data held in ROM 202, and thereby controls the operation of the electromagnetic actuator (for example, a solenoid) 112 which performs the compulsory operation of the motor 110 and the seatbelt locking mechanism 102.

The collision predictor 401 shown in FIG. 4 identifies whether or not there is a possibility of a collision with a vehicle driving ahead or any other obstacles, and also whether or not such collision can be avoided. For example, a non-contacting distance sensor such as a laser radar, a supersonic sensor, etc. periodically measures the distance between another vehicle or an obstacle at predetermined moments. A relative speed is calculated by the changes in such distance and the elapsed time. The time remaining until a collision is calculated by subtracting the relevant distance according to the relative speed. If the time remaining until the collision is shorter than the preset time T1, the possibility of a collision is indicated by an output of a collision prediction signal. This signal is provided to an inputting interface 204, and a "collision prediction flag" in a flag region (flag register) of a RAM 203 is thereby set "on." As a consequence, the interruption processing explained below is commenced by the CPU 201.

The output by a buckle switch 307 is communicated via the input interface 204, and a flag corresponding to the fastening/non-fastening of the seatbelt is set in the flag region of the RAM 203.

The collision detector 402 detects by the acceleration sensor the impact caused to the vehicle at the time of a collision, and processes an acceleration signal and detects a collision according to the size and the initial waveform thereof. This signal is provided to the input interface 204, whereby a "collision detection flag" included in the flag region of the RAM 203 is set "on." As a consequence, the interruption processing later explained is commenced by the CPU 201.

Furthermore, A/D conversions of voltages output by the aforementioned potentiometer 111 is performed by the input interface 204 at prescribed intervals, but this processing has no direct relation with the present invention and is therefore not shown in the figure. The input interface 204 internally comprises a CPU, and monitors the output voltage data after it has been converted. For example, if the value of the output voltage data obtained in the current processing differs from the output voltage data obtained in the previous processing, then the rotational status of the shaft 103a is identified, whereby either a "seatbelt protraction" flag or a "seatbelt winding" flag is set to the flag region of the RAM 203 depending on whether or not the difference in the output voltage is negative or positive compared with the data obtained in the previous processing. Furthermore, the output voltage data is written to the rotation amount area in the RAM 203 by a DMA operation. When the seatbelt has been wound, the change in the output voltage data in the seatbelt in the seatbelt protracting direction corresponds to the amount of the slack in the seatbelt. The amount of the slack in the seatbelt is written to the slack amount area in the RAM 203.

A current detector CT provided at a motor driving circuit 206 (explained below) detects a voltage passing through the motor 110 as a voltage corresponding to the current. The voltage is subject to A/D conversions performed by the input interface 204 at prescribed intervals, and is thereafter written to the motor current region in the RAM 203 by a DMA operation. Since the current of the motor 110 is related with a torque of the motor, the torque can be estimated by the value of the load current. The torque of the motor 110 constitutes a force (tension) for retracting the seatbelt 302.

When a prescribed condition set in the controlling program is fulfilled, the CPU 201 gives an output interface 205 a normal rotation order, a reverse rotation order, or a drive suspension order regarding the motor 110. The output interface 205 creates gate signals G1 and G2 pursuant to these orders, and the signals are provided to the motor driving circuit 206. When a normal rotation order is given, the gate signals Gi and G2 are respectively set at "H" and "L". When a reverse rotation order is given, the gate signals G1 and G2 are respectively set at "L" and "H". When a drive suspension order is given, the gate signals G1 and G2 are respectively set at "L1" and "L".

Figure 5:
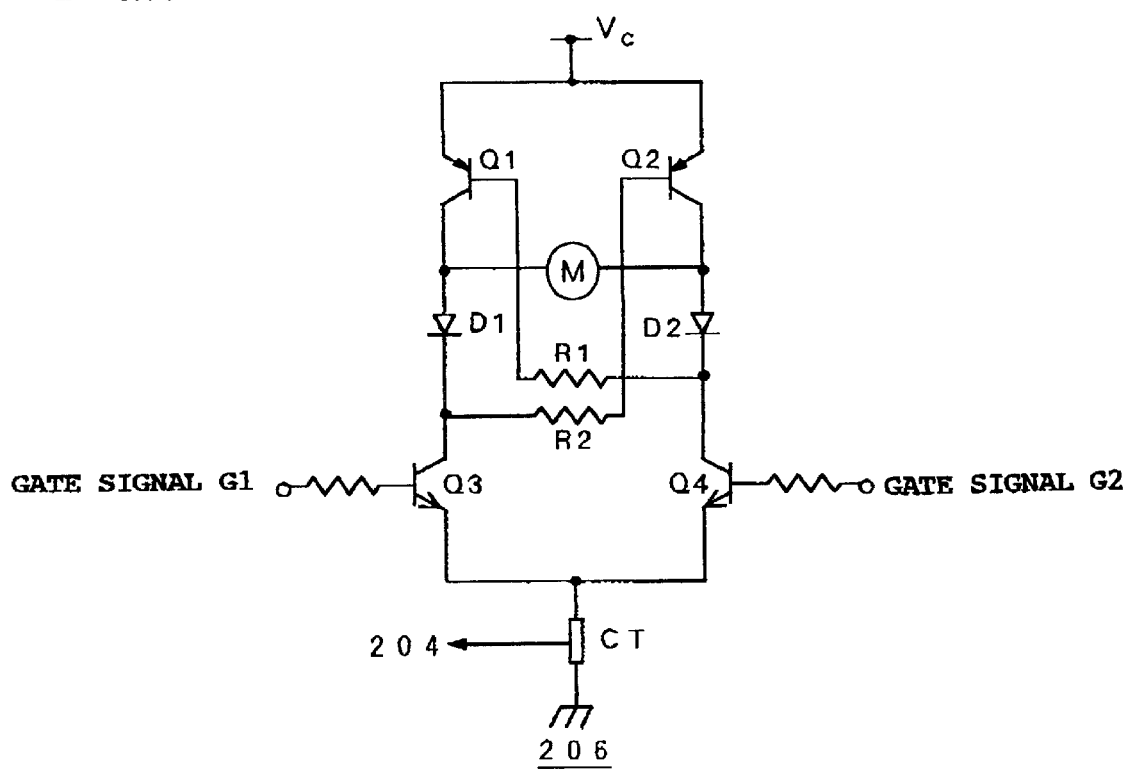
FIG. 5 is a circuit diagram explaining an example of a structure of a motor driving circuit.

FIG. 5 is a circuit diagram showing an example of a structure of a motor driving circuit. A transistor bridge circuit is formed by four transistors, i.e., PNP transistors Q1 and Q2, and NPN transistors Q3 and Q4. Emitters of transistors Q1 and Q2 are mutually connected and a power source Vc is supplied to their connection point. Furthermore, emitters of transistors Q3 and Q4 are mutually connected and the connection point becomes a ground level.

As already mentioned, the current detector CT detects the level of the currents outputted by the emitters for each of the transistors Q3 and Q4, and sends a level detection signal to the input interface 204. The input interface 204 performs an A/D conversion of the level detection signal, and thereafter writes the obtained data to the seatbelt tension area in the RAM 203 through a DMA operation. Since the value of the load current passing through the motor is related with the torque of the motor, the seatbelt tension F can be thereby estimated.

The collector of the transistor Q1 and the collector of the transistor Q3 are connected via a diode D1. The collectors of the transistor Q2 and Q4 are connected via a diode D2. The base of the transistor Q1 and the collector of the transistor Q4 are connected via a bias resistance R1. The base of the transistor Q2 and the collector of the transistor Q3 are connected via a bias resistance R2. A DC electric motor M is connected between the respective collectors of the transistors Q1 and Q2.

With such structure, when a normal rotation order (G1= "H"; G2="L") is supplied to the respective gates of the transistors Q3 and Q4 from the output interface 205, the transistor Q3 becomes conductive and the transistor Q4 becomes non-conductive. The collector of the transistor Q3 becomes a ground level by the conductivity, and the base of the transistor Q2 is biased to a low level (substantially a ground level) via the resistance R2 and makes the transistor Q2 conductive. The collector of the transistor Q4 becomes substantially the power source Vc level, and the base of the transistor Q2 is biased to a high level via the resistance R1 and makes the transistor Q1 non-conductive. As a result, a current path is formed in a forward direction by a route: power source Vc, transistor Q2, motor M, diode D1, transistor Q3, and the ground Thus, the motor M rotates in the seatbelt winding direction.

When a reverse rotation order (G1="L"; G2="H") is supplied to the respective gates of the transistors Q3 and Q4 from the output interface 205, the transistor Q3 becomes non-conductive and the transistor Q4 becomes conductive. The collector of the transistor Q4 becomes a ground level, and the base of the transistor Q1 is biased to a low level via the resistance R1 and makes the transistor Q1 conductive. The collector of the transistor Q3 becomes substantially the power source Vc level, and the base of the transistor Q2 is biased to a high level via the resistance R2 and makes the transistor Q2 non-conductive. As a result, a current path is formed in a reverse direction by a route power source Vc, transistor Q1, motor M, diode D2, transistor Q3, and the ground. Thus, the motor M rotates in a direction to protract the seatbelt.

When a drive suspension order (G1="L"; G2="L") is supplied to the respective gates of the transistors Q3 and Q4 from the output interface 205, both of the NPN transistors Q3 and Q4 become non-conductive. If the transistor Q3 becomes non-conductive from a conductive state, the collector of the transistor Q3 is enhanced from the ground level to substantially the power source level, and the base of the transistor Q2 is biased to a high potential and the transistor Q2 is cut off Similarly, if the transistor Q4 becomes non-conductive from a conductive state, the collector of the transistor Q4 is enhanced from the ground level to substantially the power source level, and the base of the transistor Q1 is biased to a high potential and the transistor Q1 is cutoff. Thus, if a drive suspension order is given, the respective transistors forming the bridge become non-conductive.

Returning to FIG. 4, upon fulfillment of a condition for operating the compulsory lock of the seatbelt locking mechanism 102, the CPU 201 gives the interface 205 a lock order signal (operation of the solenoid). The activation order signal set at the flag register of the output interface 205 is amplified by a power amplifier 207 from a logic-level signal to a level capable of activating the solenoid, and the signal is then provided to the solenoid 112. The operation of the solenoid causes the displacement of the actuator and the operation of the locking mechanism 102 of the retractor 100. When operated, the seatbelt locking mechanism 102 prevents the protraction of the wound seatbelt so that there is no slack in the seatbelt, but allows the winding of the seatbelt.

Figure 6:
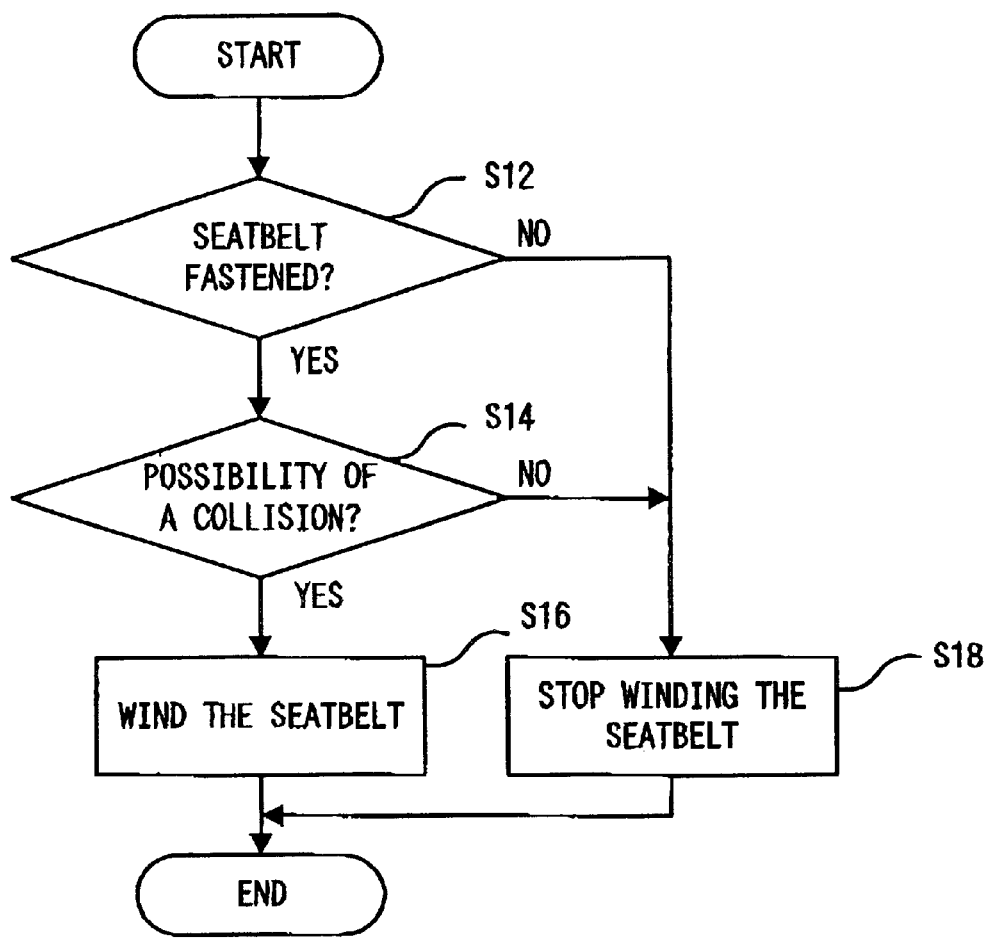
FIG. 6 is a flowchart explaining an example of controlling a first tension modifier by a controller.

FIG. 6 is a flowchart explaining the control performed by a controller 200. Here, the operation of a first tension modifier, namely, a seatbelt winding motor is controlled.

By executing a main program, the CPU 201 periodically monitors the seatbelt fastening flag (S12). When the seatbelt fastening flag is "on" (S12; Yes), the CPU 12 determines the possibility of a collision according to whether or not a collision prediction flag is set (S14). If the flag is set (S54; Yes), the motor driving circuit 206 is operated and the motor 110 serving as a slack remover or a tension modifier is driven and made to rotate in the seatbelt winding direction for winding a webbing 302 (S16). Thus, the slack in the seatbelt is removed to a certain degree. For example, winding of the seatbelt may be performed either until the tension of the seatbelt exceeds a prescribed value, or for the duration of a prescribed period of time. The tension of the seatbelt can be identified by reading the sample value written in the current value area in the RAM 203.

When the seatbelt is not fastened (S12; No) or the collision prediction flag is "off" (S14; No), there is no need to remove the slack in the seatbelt. Therefore, the CPU 201 orders the output interface 205 to stop driving the motor 110, so that the motor would stop rotating to wind the seatbelt (S18). Consequently, the motor driving circuit 206 stops supplying the motor 110 with a current, and the operation of the motor 110 is terminated. The routine is thus terminated, and the processing returns to the main program.

If a seatbelt is not fastened, the seatbelt is housed in the seatbelt winding device 100 by the force of a seatbelt winding spring 114. When the seatbelt is fastened, the minimum slack in the seatbelt is removed.

Figure 7:
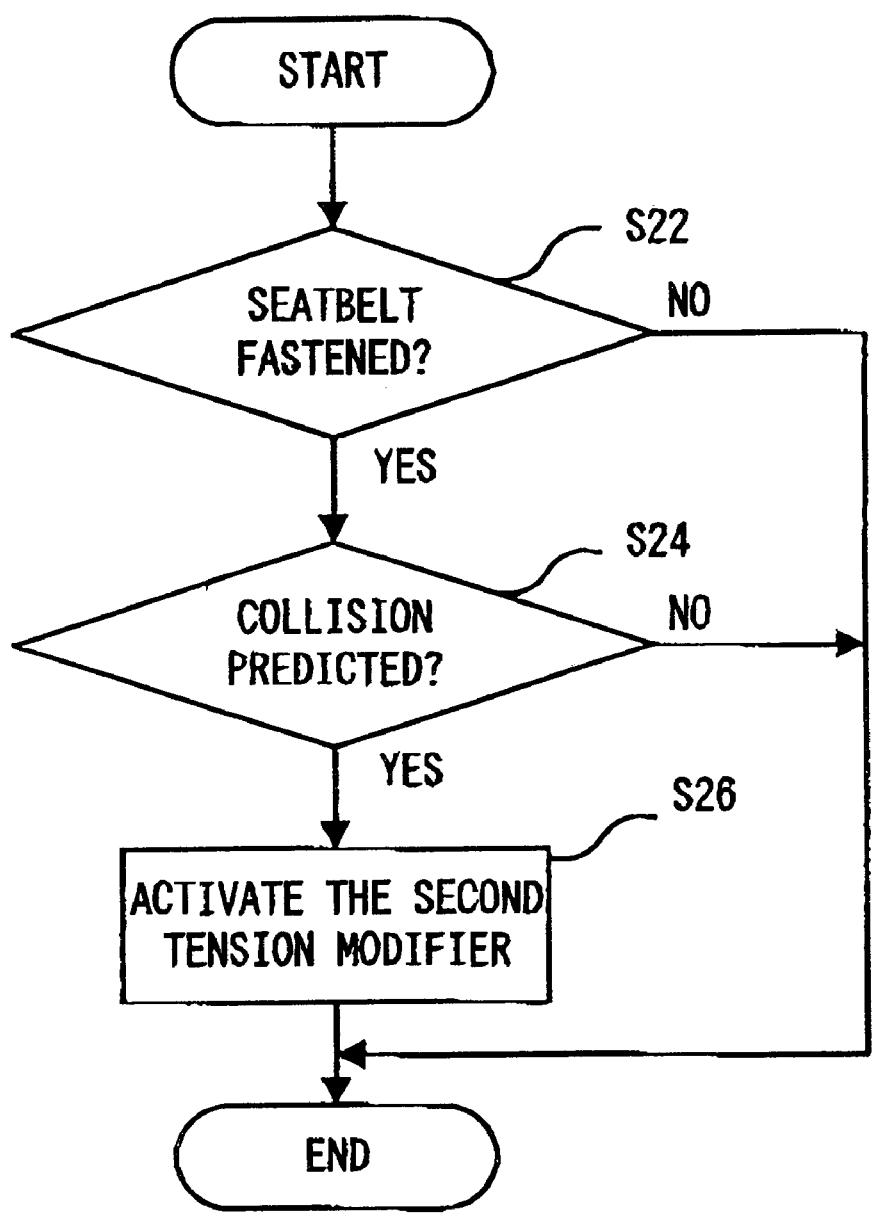
FIG. 7 is a flowchart explaining an example of controlling a second tension modifier by the controller.

Now, referring to FIG. 7, the operation of the pretensioner serving as the second tension modifier is explained.

The CPU 201 executes this routine either periodically or pursuant to an interruption processing. If the seatbelt is fastened (S22; Yes), the CPU 201 identifies whether or not any collision is detected (S24). If the collision detection flag is set "on" and a collision is thereby detected (S24; Yes), the CPU 201 activates the pretensioner 104, which is activated by an explosive system, as the second tension modifier. The seatbelt is thereby quickly retracted, and the slack in the seatbelt is taken up, whereby the occupant is firmly secured. If the seatbelt is not fastened (S22; No), or no collision is detected (S24; No), the second tension modifier is not operated, and the routine is terminated.

Figure 8:
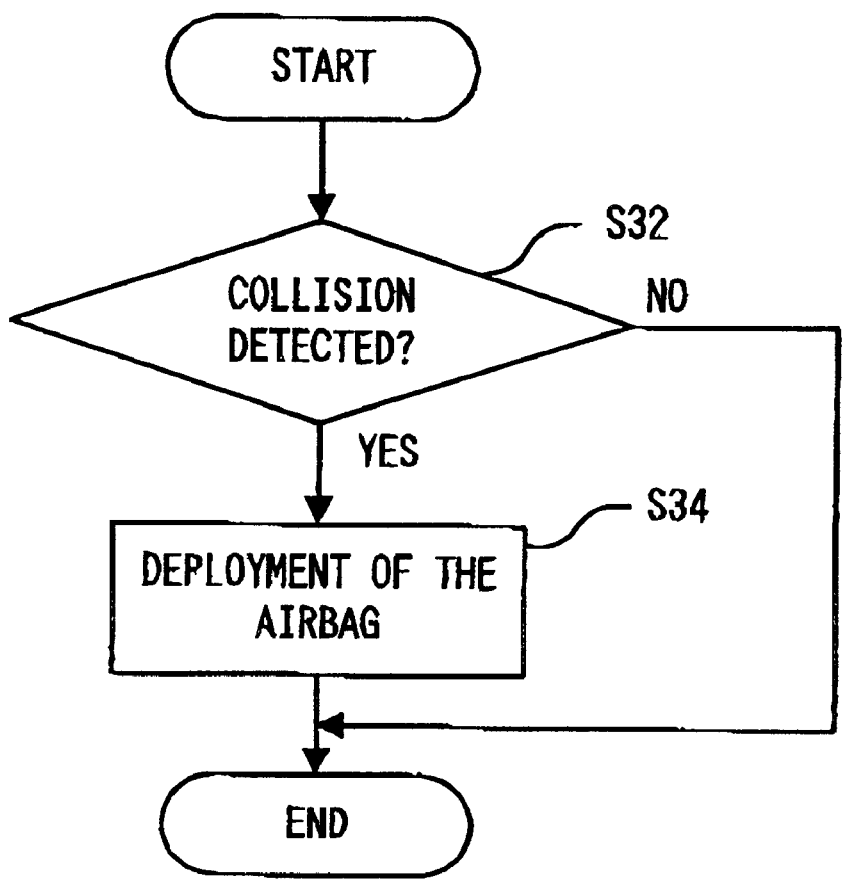
FIG. 8 is a flowchart explaining an example of controlling an airbag device by the controller.

FIG. 8 is a flowchart explaining an example of controlling the operation of the airbag device.

The CPU 201 executes this routine either periodically or by an interruption processing. If the collision detection flag is set "on" and a collision is thereby detected (S32; Yes), the CPU 201 supplies the airbag device with an ignition signal for igniting the low-explosive powder, and the quick expansion of the combustion gas makes the airbag deploy (S34). Thus, the occupant is saved from any secondary collision inside the vehicle. If no collision is detected (S32; No), this routine is terminated.

Figure 9:
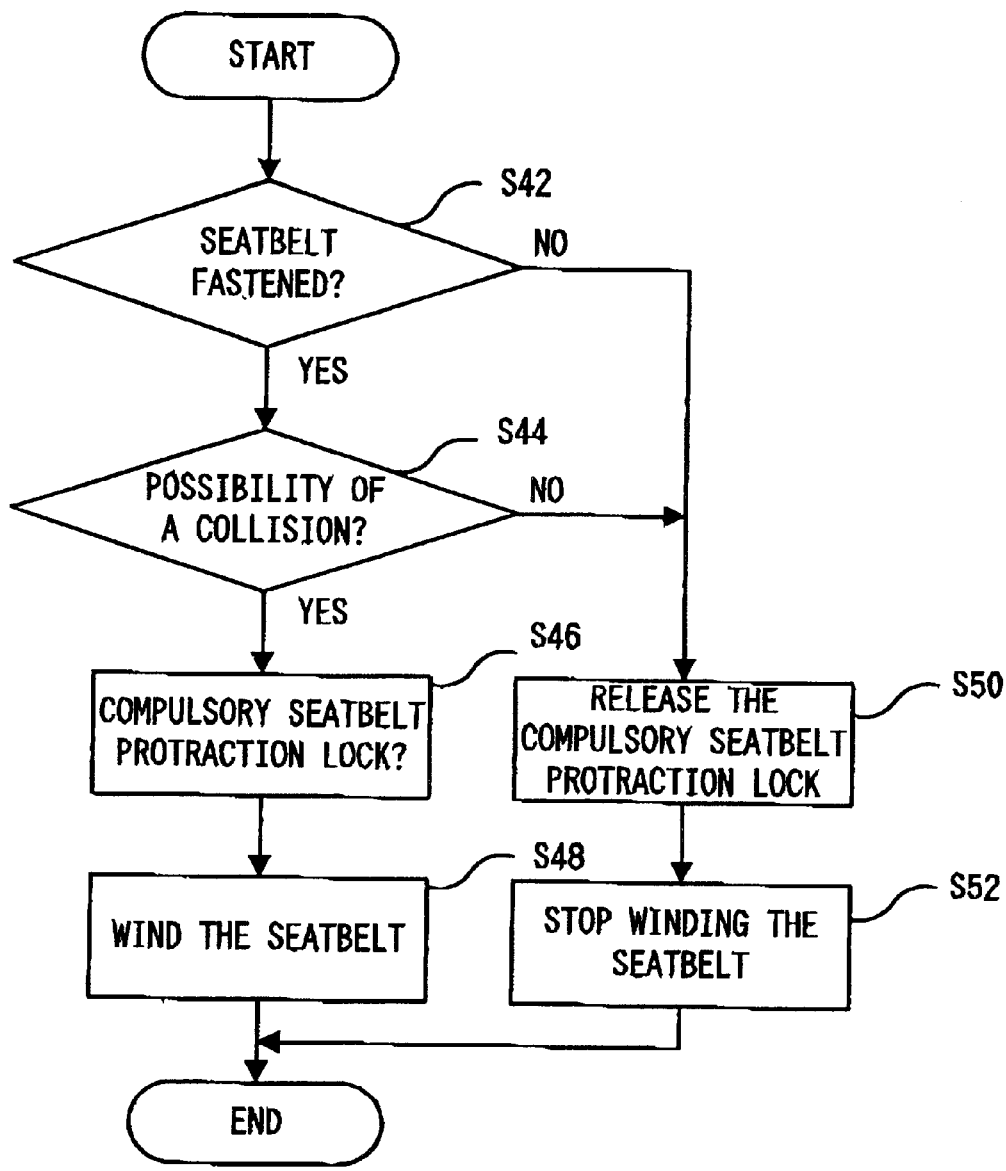
FIG. 9 is a flowchart explaining the compulsory locking operation of a seatbelt locking mechanism controlled by the controller.

FIG. 9 is a flowchart explaining the compulsory operation of the seatbelt locking mechanism.

If the first tension modifier operated by the collision detection signal from the collision detector 401 shown in FIG. 4 is, by itself, or together with the second tension modifier, operated by the collision detection signal which is output from the collision detector 402 shown in FIGS. 1 and 4 and communicated to a portion other than the seatbelt retractor (e.g., the securing portion of the buckle, or a wrap belt), then the operation of the tension modifier(s) acts in the direction for protracting the seatbelt. Accordingly, the tension of the seatbelt is ensured by performing a compulsory operation of the seatbelt locking mechanism in advance and preventing any protraction of the seatbelt.

The CPU 201 executes the main program and periodically monitors the seatbelt fastening flag (S42). If the seatbelt fastening flag is "on" (S42; Yes), a possibility of a collision is detected depending on whether or not the collision protection flag is set (544). If the flag is "on" (S44; Yes), a lock ordering signal is communicated to the output interface 205, and the locking mechanism 102 of the retractor 100 is operated. When operated, the seatbelt locking mechanism 102 prevents the protraction of the wound seatbelt and the slack in the seatbelt, but allows the winding of the seatbelt (S46). The CPU 201 operates the motor driving circuit 206 and drives the motor 110 so that it rotates in the seatbelt winding direction for winding the webbing 302 (S48). Thus, the slack in the seatbelt is removed to a certain degree. For example, winding of the seatbelt may be performed either until the tension of the seatbelt exceeds a prescribed value, or for the duration of a prescribed period of time. The tension of the seatbelt can be identified by reading the sample value written in the current value area in the PAM 203.

If the seatbelt is not fastened (S42; No), or the collision prediction flag is "off" (544; No), the CPU 201 is not required to operate the seatbelt locking mechanism and a command for releasing the lock is provided to the output interface 205. As a result, the lock is released, and the seatbelt can be protracted (S50). Subsequently, an order for ceasing to drive the rotation of the motor 110 is provided to the output interface 205 (S52). Consequently, the motor driving circuit 206 stops supplying the motor 110 with a current, and the operation of the motor 110 is terminated. The routine is thus terminated, and the processing returns to the main program.

Furthermore, if the seatbelt is not fastened, the seatbelt is stored in the retractor 100 by the force of the winding coil 114. If the seatbelt is fastened, the minimum slack in the seatbelt is removed as explained in the case above.

Figure 10:
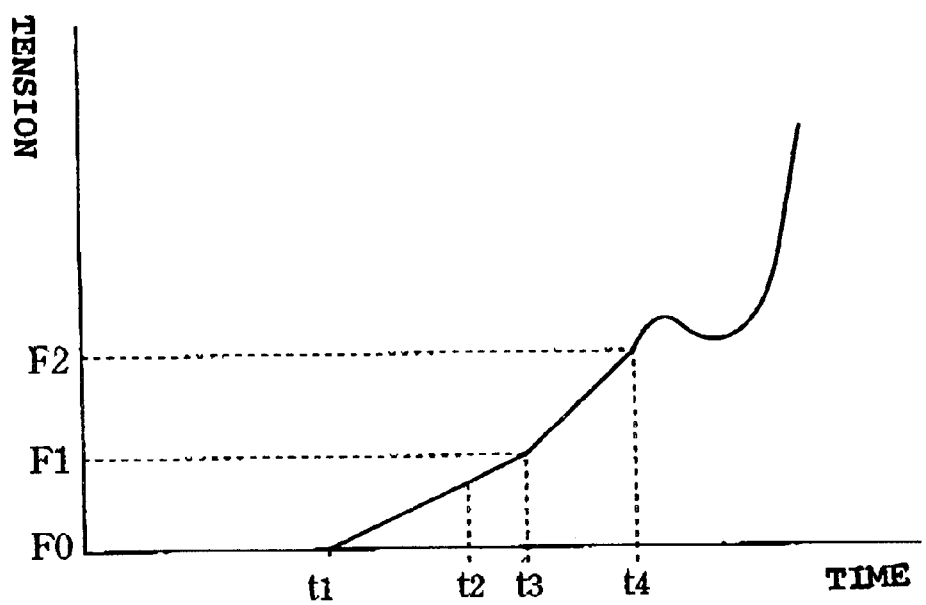
FIG. 10 is a graph showing changes in the seatbelt tension when the seatbelt device is activated.

FIG. 10 is a graph which shows for the elapsed time the changes in the seatbelt tension when the first and second tension modifiers and the airbag device are activated by the controlling process illustrated in FIGS. 6 through 8.

In FIG. 10, the possibility of a collision is identified at time t1, and the operation of the motor 110 is commenced and the tension of the seatbelt increases from F0 by the winding coil. At time t2, a collision takes place. At time t3, the collision is detected and the pretentioner 104 and the airbag 500 are operated. Since the seatbelt is wound by the motor 110 and the pretensioner 104, the tension of the seatbelt quickly rises from tension F1 as of t1. Due to the impact of the collision, the seatbelt locking mechanism 102 locks the protraction of the seatbelt by a VSI operation. After time t4, where the tension of the seatbelt reaches F2, the tension is further increased by the addition of a forward inertia force acting on the occupant in the direction to protract the seatbelt from the retractor 100.

Furthermore, when the impact of the collision is added to the vehicle, the protraction of the seatbelt is locked by the VSI sensor located at the seatbelt retractor 100. Moreover, if the seatbelt 302 is quickly protracted by the WSI sensor located at the seatbelt retractor 100, the protraction of the seatbelt 302 is locked.

Figure 11:
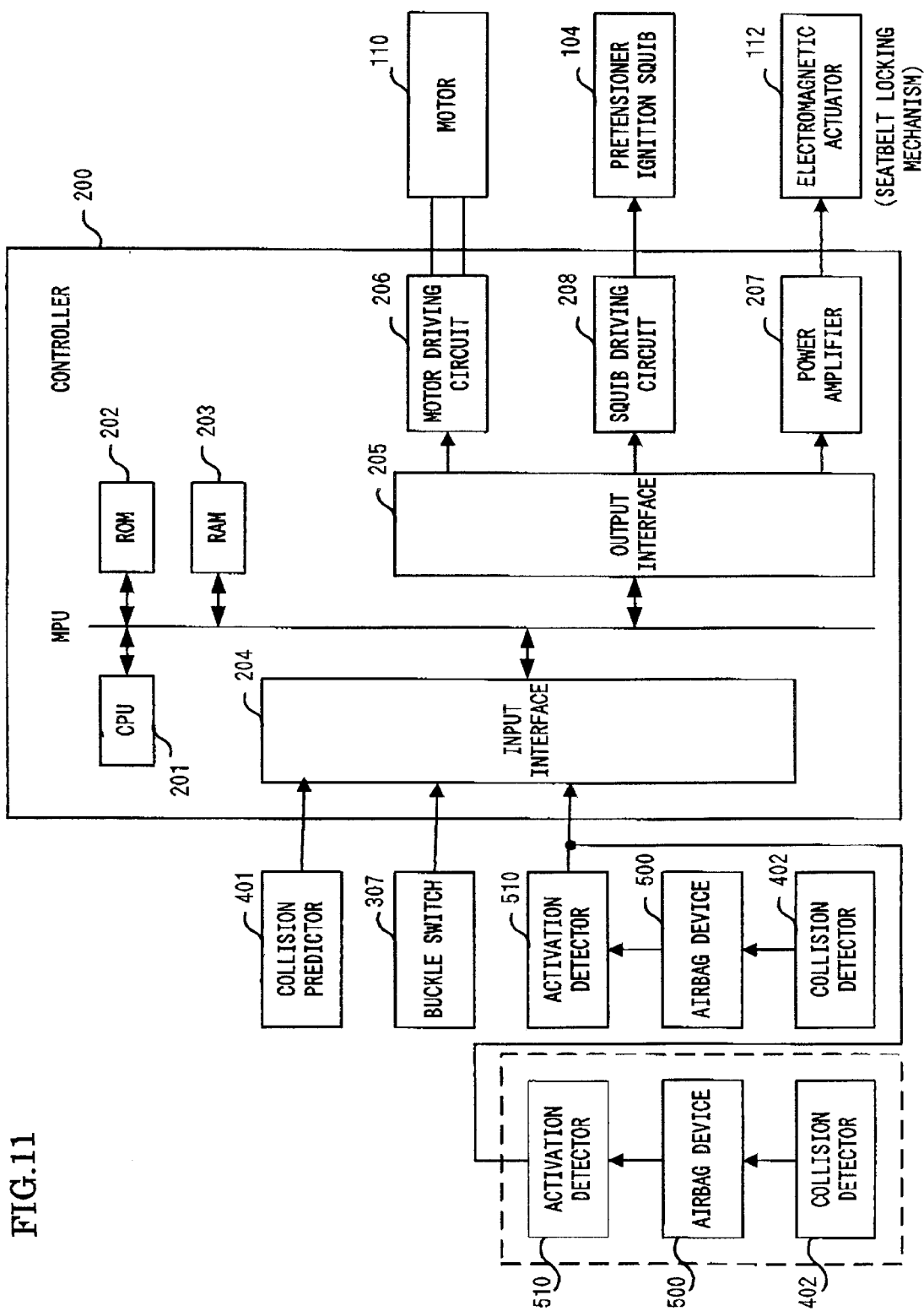
FIG. 11 is a block diagram showing another example of a structure of the controller.

FIG. 11 is a block diagram explaining the second embodiment of the present invention. In this figure, components corresponding to those of FIG. 4 are shown with the same reference numerals, and explanations for such components are omitted.

According to this example, an operation of the airbag 500 provided independently from the seatbelt devise and operating independently from the seatbelt device is used by the seatbelt device for detecting a collision.

When a collision detection signal is communicated to the airbag device 500 from the collision detector 402 detecting the collision of the vehicle, an ignition current is conducted through an ignition squib, whereby the low-explosive powder ignites and expansion gas is generated, and the airbag deploys. Supply of the ignition current is detected by the activation detector 510. Regarding the detection of the ignition current, activation of the airbag, for example, can be detected by mounting a clamp-type current sensor on a wire harness through which the ignition current flows, and determining whether or not the detected current exceeds a prescribed value. Otherwise, activation of the airbag may be detected by providing a temperature sensor in the vicinity of the igniter of the airbag and identifying an activation of the airbag when the temperature of the ignited portion exceeds a prescribed value.

The activation detector 510 supplies the input interface 204 with an activation detection signal. Through a DMA operation, the input interface 204 sets the activation detection flag "on" in the flag region of the RAM 203. This means that a vehicle collision has taken place, and therefore, the aforementioned collision detection flag may be set "on".

In some cases, multiple airbag devices 500 can be provided at the center portion of the steering wheel, in the dashboard of the passenger seat, by the side doors, etc. In such cases, as shown in FIG. 11, an activation detectors 510 can be mounted on each of the airbag devices, so that the activation detection signal in each of the activation detector 510 is provided to the input interface 204. This allows the CPU 201 to determine that a vehicle collision has taken place. Other parts of the invention have the same structure as explained above.

Figure 12:
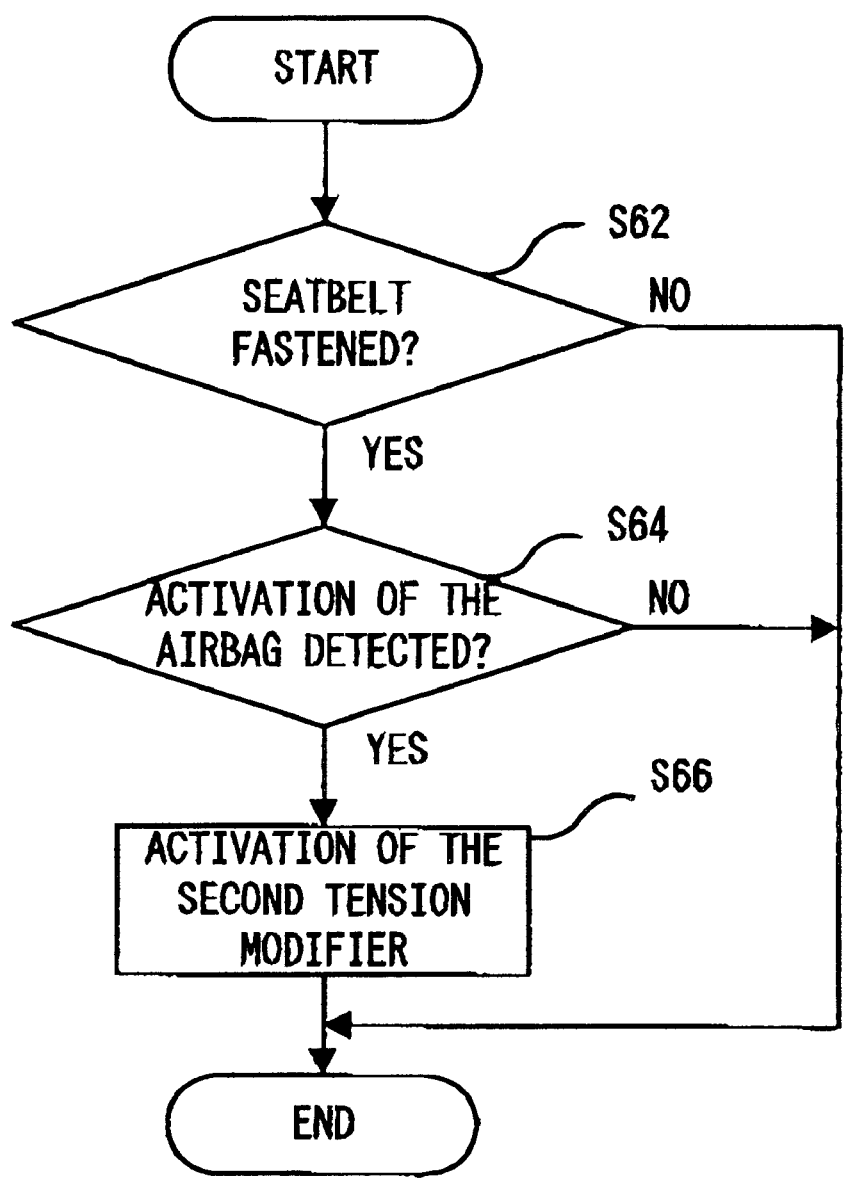
FIG. 12 is a flowchart explaining an example where the detection of a vehicle collision by the controller is detected by the activation of the airbag device.
Figure 13:
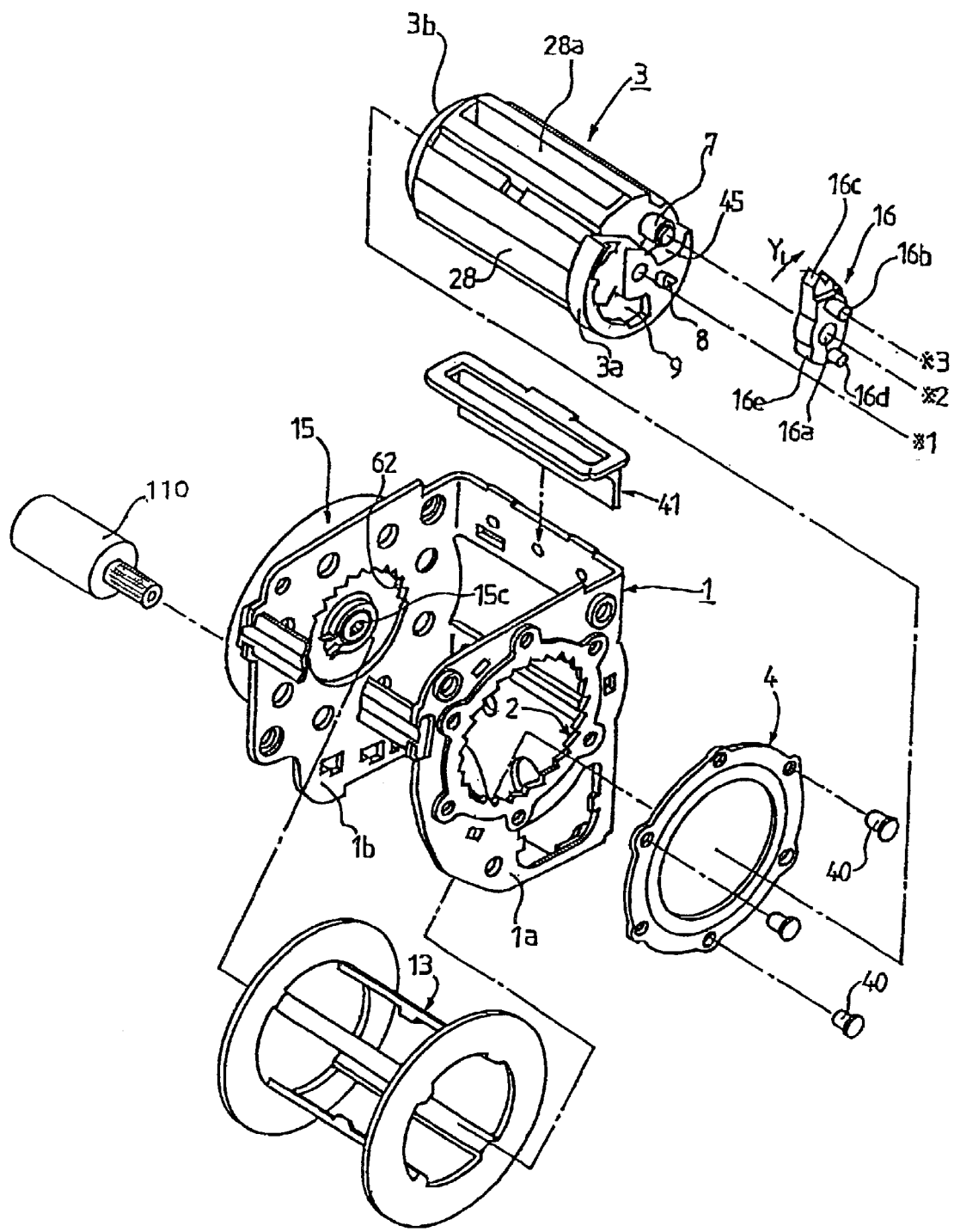
FIG. 13 is a perspective view explaining an example of a portion of a seatbelt retractor.
Figure 14:
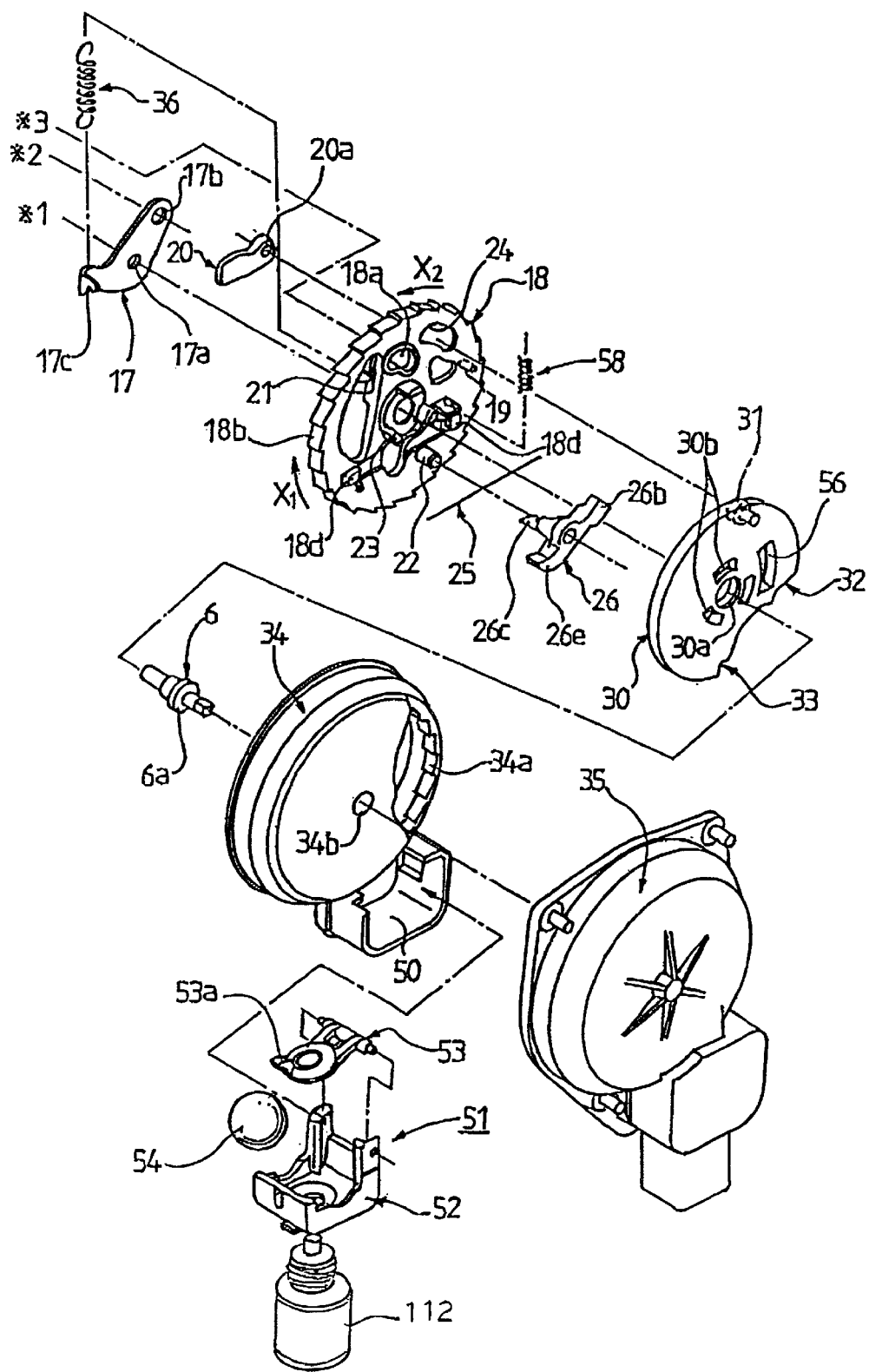
FIG. 14 is a perspective view explaining another example of a portion of a seatbelt retractor.
Figure 15:
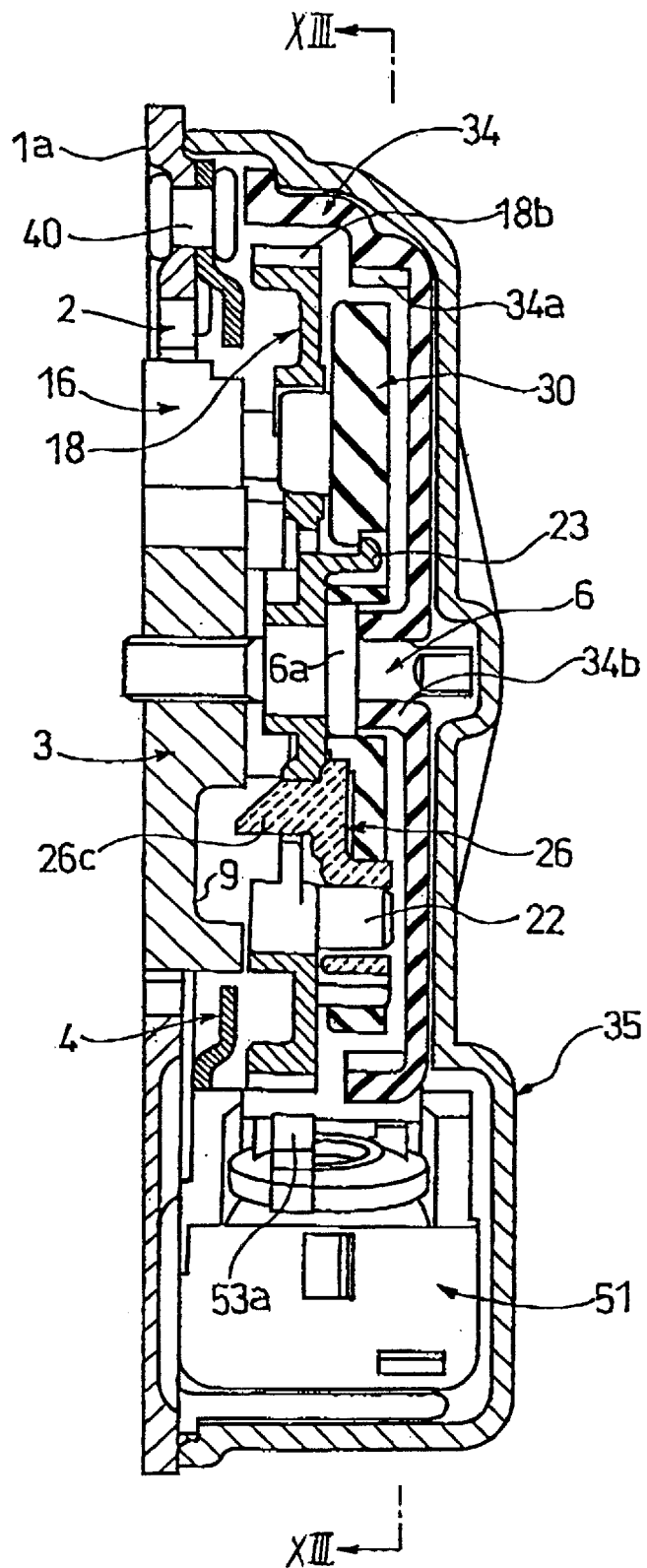
FIG. 15 is a cross section of the locking mechanism of FIG. 14, shown in the direction of the rotational axis of a ratchet wheel 18.

FIG. 12 is a flowchart explaining an example of controlling the operation of the pretensioner constituting a second tension modifier, synchronizing with the operation of the airbag device.

The CPU 201 executes this routine either periodically or by an interruption processing. If the seatbelt is fastened (S62; Yes), the CPU 201 identifies whether or not activation of the airbag device is detected (S64). If the activation detection flag is set "on" and the operation of the airbag device, i.e., a collision is detected (S64; Yes), the CPU 201 operates the powder pretensioner 104 serving as the second tension modifier (S66). The seatbelt is thereby quickly wound, and the slack in the seatbelt is removed, whereby the occupant is firmly secured If the seatbelt is not fastened (S62; No), or no collision is detected (S64; No), the second tension modifier is not activated, and this routine is terminated.

FIGS. 13 through 24 are exploded perspective views of the retractor 100 and longitudinal sectional views of the major part thereof, chiefly explaining the seatbelt locking mechanism 102 (the mechanical locking mechanism of the reel, the WSI locking mechanism which is operated when sensing the seatbelt protraction acceleration, the VSI locking mechanism which is operated when sensing the vehicle deceleration, etc.), and the electromagnetic actuator 112. As shown in FIG. 9, when a possibility of a collision is identified, a compulsory locking of the seatbelt locking mechanism 102 takes place. Accordingly, the mechanical locking mechanism explained below is provided mainly for securing the occupant at the time of a collision if the operation of this compulsory lock is hindered for any reason. In an example shown in FIG. 13, no pretensioner is provided. If a pretensioner is required due to the property of the vehicle, the pretensioner 104 shown in FIG. 2 is provided between a retractor base 1 and a power transmission unit 15 shown in FIG. 13.

In FIGS. 13 through 18, the major part of the retractor base has a substantially U-shaped cross section. The facing side plates 1a and 1b have facing winding shaft through holes provided thereon. The reel 3, which serves as the winding shaft for winding the seatbelt 302 (not shown), passes through these winding shaft through holes and is rotatably provided thereto.

The winding shaft through holes on the side plate 1a has inner gear teeth 2 formed along its inner periphery, and a ring 4 is provided outside of the winding shaft through hole. A drawing processing is performed on the inner periphery of the ring 4, and when the ring 4 is fixed to the outside of the side plate 1a by a rivet 40, a gap is formed in the axial direction between the inner gear teeth 2 and the inner periphery edge of the ring 4.

The retractor base 1 further comprises, on the side plate 1a side, an emergency locking mechanism for preventing any protraction of the seatbelt upon an emergency. Furthermore, provided to the side plate 1b side of the base 1 is a power transmission unit 15 which includes: a pulley 105 connected to an axis 15c (corresponds to the reel shaft 103a) driven by the electric motor 110 via a timing belt 107; a winding coil 114; and a potentiometer 111 (all not shown). The reel 3 is substantially a cylindrical winding shaft integrally formed of aluminum alloy or the like. A barrel 28 to which the seatbelt is wound has a slit opening 28a in the diameter direction for passing and holding the seatbelt end therein. Furthermore, on the outer periphery of the reel 3, a flange 13 formed as a separate body is provided for preventing any winding disorder of the seatbelt. Furthermore, the seatbelt is wound along the outer periphery of the reel 3 mounted on the retractor base 1. The seatbelt is inserted and passed through the seatbelt guide 41 fixed to the upper portion of the back plate of the retractor base 1, and the incoming/out position of the seatbelt is thereby restricted.

A protruding rotation spindle for rotatably supporting the reel 3 is provided to both ends of the reel 3. A separately-formed spindle pin 6 is press fitted to the sensor side end face of the reel 3 and serves as a rotation spindle. The sensor side end face of the reel 3 further comprises a protruding spindle 7 which rockably supports a pole 16 serving as a lock member engagable with the inner gear teeth 2 formed on the side plate 1a. Furthermore, when the pole 16 rocks and rotates in the direction to engage with the inner gear teeth 2, the positions of the rocking side end of the pole 16 and the rear end 16e thereof on the opposite side are defined, and when a large load is fastened to an area between the inner gear teeth 2 and the pole 16, a pressure receiving face 45 for receiving the load is provided on the sensor side end face of the reel 3.

Furthermore, on the sensor side end face of the reel 3, a stopper protrusion 8 is provided for the purpose of preventing a counterclockwise rotation of the rocking lever 20 supported in a rockable manner by a ratchet wheel 18 which serves as a latch member of the lock operator explained below. A concave part 9 constitutes a recess for preventing any interference to the reel 3 either by the extension coil spring 36 urging the rotation of the ratchet wheel 18 in the seatbelt protracting direction (direction of arrow X2 shown in FIG. 14) or by an arm portion 26c of the lock arm 26 pressing the sensor spring 25 explained below.

The rocking end of the pole 16 comprises an integrally-formed gear teeth 16c which corresponds to and is engagable with the inner gear teeth 2 formed on the side plate 1a. Moreover, a spindle hole 16a, to which a spindle 7 is fitted with some recess, penetrates the center of the pole 16. Furthermore, an engaging protrusion 16b located on the rocking end side and an engaging protrusion 16d located on the rear end 16e side protrude from the sensor side end face of the pole 16.

In other words, since the spindle 7 is loosely fitted to the spindle hole 16a, the pole 16 is rockably and rotatably supported by the spindle 7, and is capable of making relative movements in a prescribed amount. Furthermore, the tip of the spindle 7 penetrating the spindle hole 16a of the pole 16 is fastened by the stopper hole 17b of a retaining plate 17, and a through hole 17a of a retaining plate 17 is penetrated by a spindle 6 which is press fit to the reel 3. The retaining plate 17 prevents the pole 16 from lifting up from the end face of the reel 3.

Furthermore, the end of the engaging protrusion 16b of the pole 16 is inserted into the cam hole 18a of the ratchet wheel 18. The ratchet wheel 18 is located at the outside of the retaining plate 17 and rotatably supported by the spindle pin 6. When the relative rotation of the ratchet wheel 18 with respect to the reel 3 is in the seatbelt winding direction (direction of arrow X1 in FIG. 14), the cam hole 18a moves the end of the engaging protrusion 16b radially outward from the rotation shaft of the reel 3. As a consequence, the pole 16 is made to rock and rotate around the spindle.7 in the direction (direction of arrow Y1 in FIG. 13) to engage with the inner gear teeth 2 formed on the side plate 1a.

Namely, the pole 16 rocks and rotates in the direction to engage with the inner gear teeth 2, and the engagement of the teeth 16c of the pole 16 with the inner gear teeth 2 constitutes a locking device for preventing any rotation of the reel 3 in the seatbelt protracting direction. The ratchet wheel 18 is a ratchet rotatably supported by the spindle pin 6. On the outer periphery of the ratchet wheel 18, ratchet teeth 18b are provided for engagement with the sensor arm 53 of the vehicle acceleration sensor 51. Furthermore, a flange 6a of the spindle pin 6 supports, as its axis, the center hole 30a of the inertia plate 30, i.e., a disc inertia element serving as a sensor for sensing the seatbelt protraction acceleration. In the vicinity of the center hole of the ratchet wheel 18, a stopper pawl portion 23 engages with the engaging hole 30b and thereby determines the position of the inertia plate 30 in the thrusting direction thereof. The long hole 24 formed on the ratchet wheel 18 is engaged with the engaging protrusion 31 of the inertia plate 30, and an edge 24a of the long hole 24 determines the position of the rotating direction of the inertia plate 30 when the emergency locking mechanism is not operated (see FIG. 16).

Figure 16:
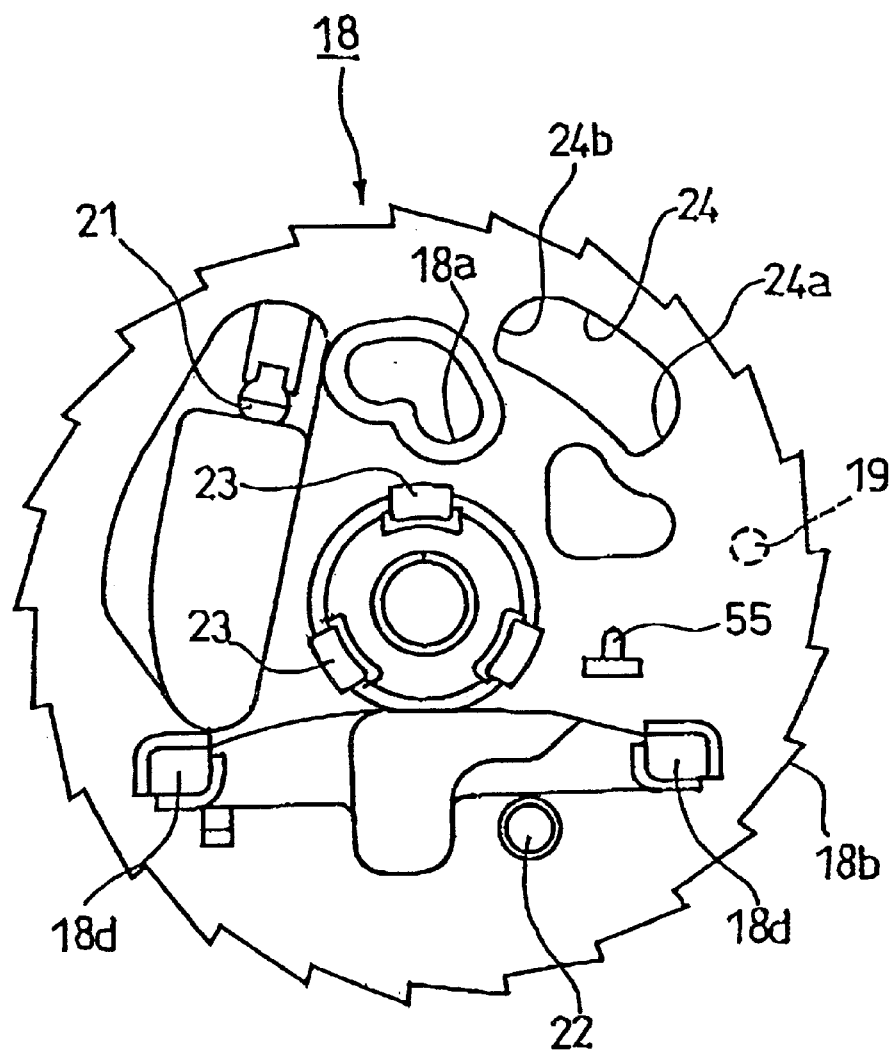
FIG. 16 is a diagram explaining the operation of a locking mechanism upon a rapid seatbelt protraction (seatbelt acceleration)
Figure 20:
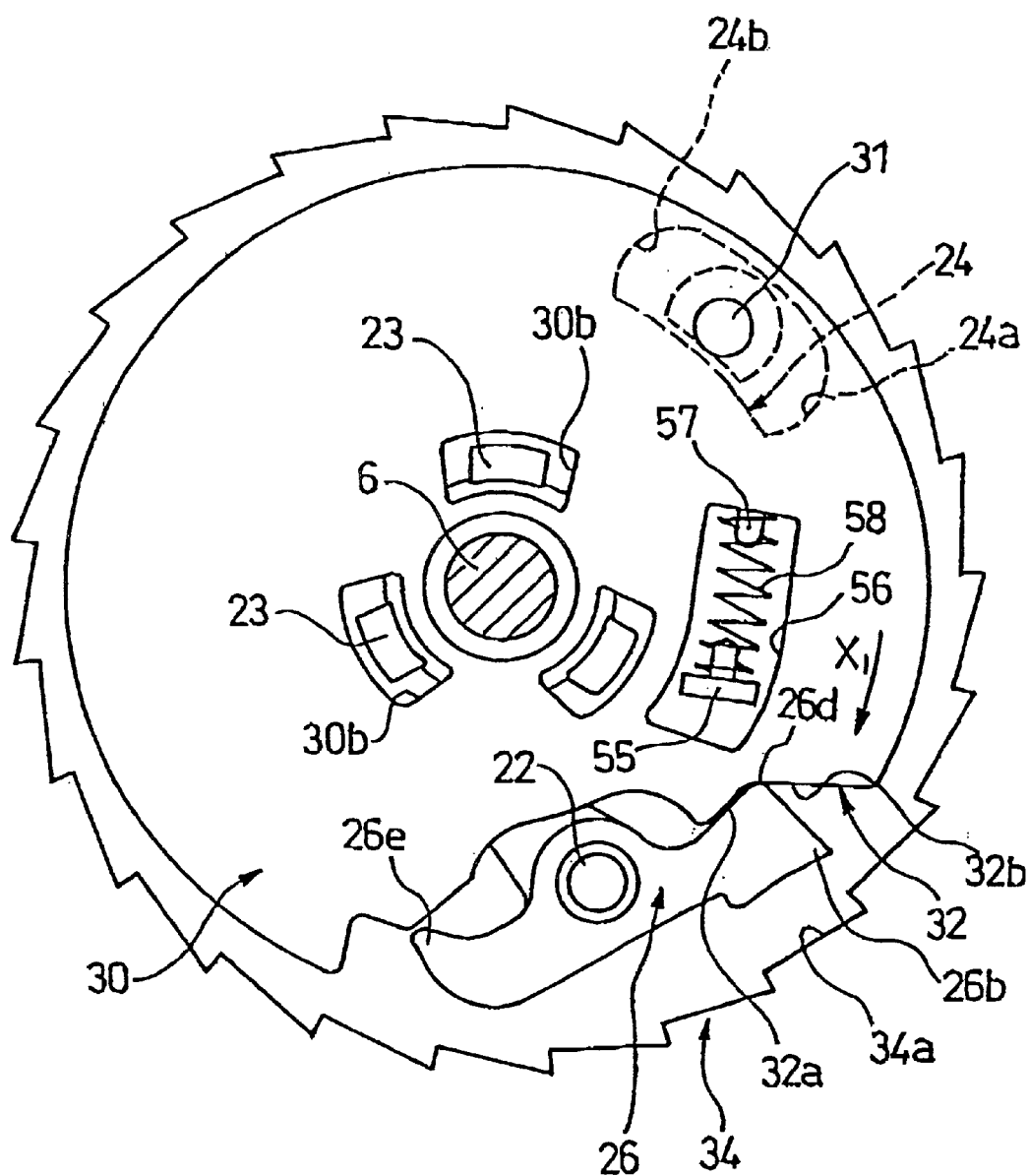
FIG. 20 is a diagram explaining the operation of a locking mechanism by the seatbelt acceleration.

As shown in FIG. 16, the outer side face of the ratchet wheel 18 comprises, protruding therefrom, a shaft 22 which supports the lock arm 26 as an axis and a spring hook portion 55. Furthermore, as shown in FIG. 20, the inertia plate 30 has an opening 56 through which the spring hook portion 55 is inserted. The opening 56 is formed as a long hole such that the inertia plate 50 is able to relatively rotate with respect to the ratchet wheel 18 while the spring hook 55 is inserted therein, and a spring hook portion 57 corresponding to the spring hook 55 is provided at one end of the opening 56.

Figure 19:
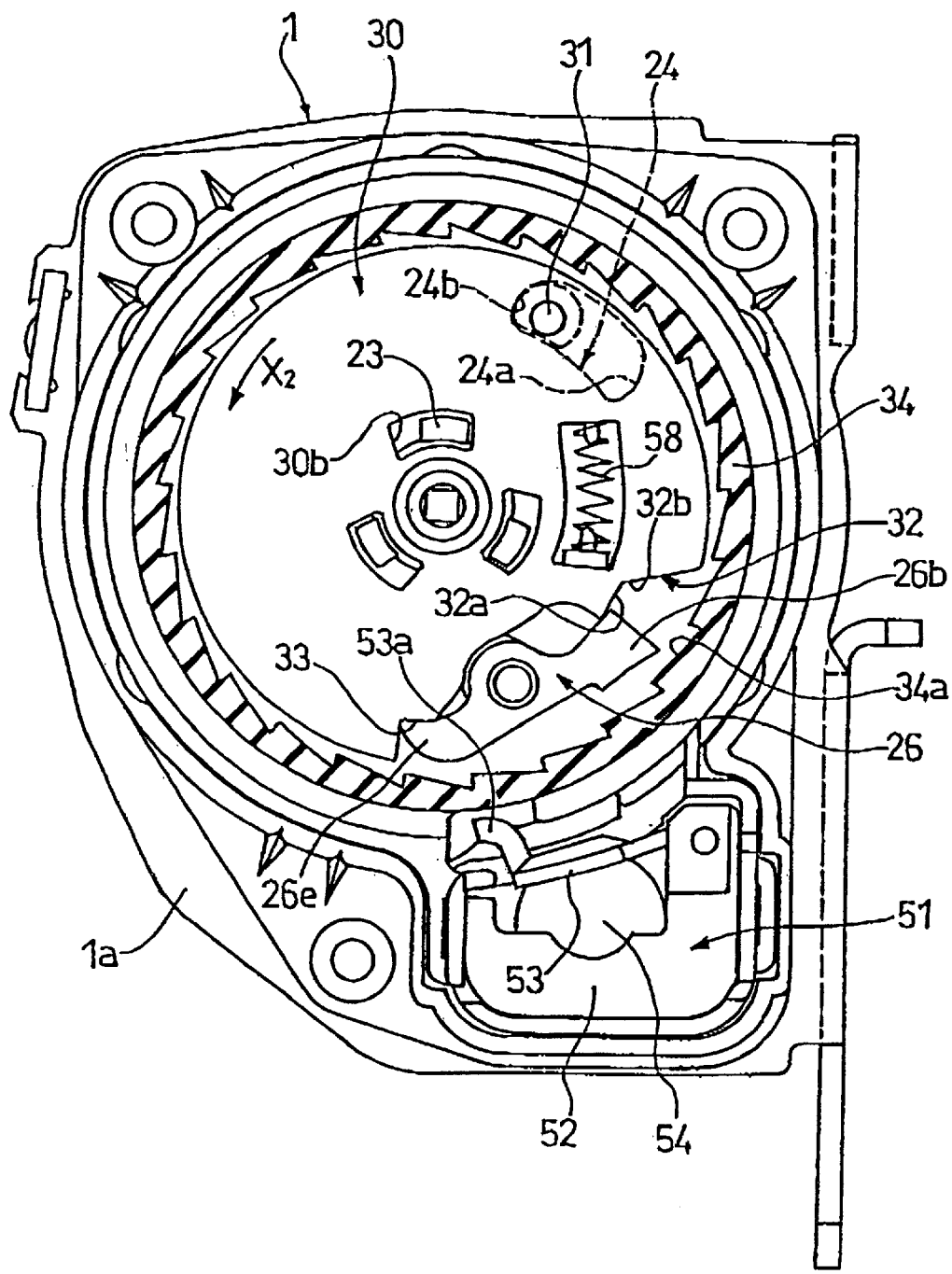
FIG. 19 is a diagram explaining the operation of a locking mechanism by the seatbelt acceleration.

A compression coil spring 58 is fitted and inserted between a pair of the spring hooks 55 and 57. As shown in FIG. 19, the compression coil spring 58 is urged so that the engaging protrusion 31 on the inertia plate 30 is maintained in an unlocked state where the inertia plate 30 touches the other end 24b of the long hole 24 formed on the ratchet wheel 18.

Figure 17:
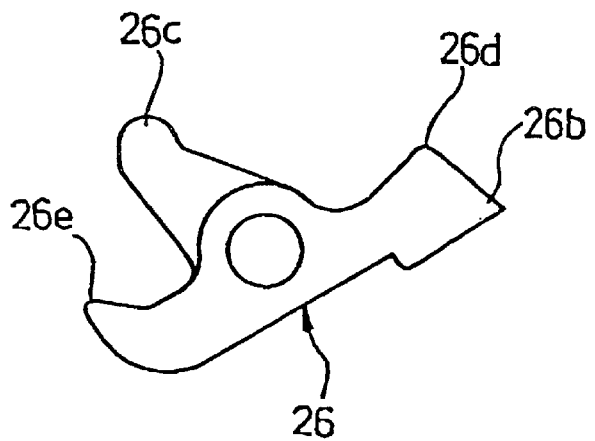
FIG. 17 is a diagram explaining a lock arm 26.
Figure 18:
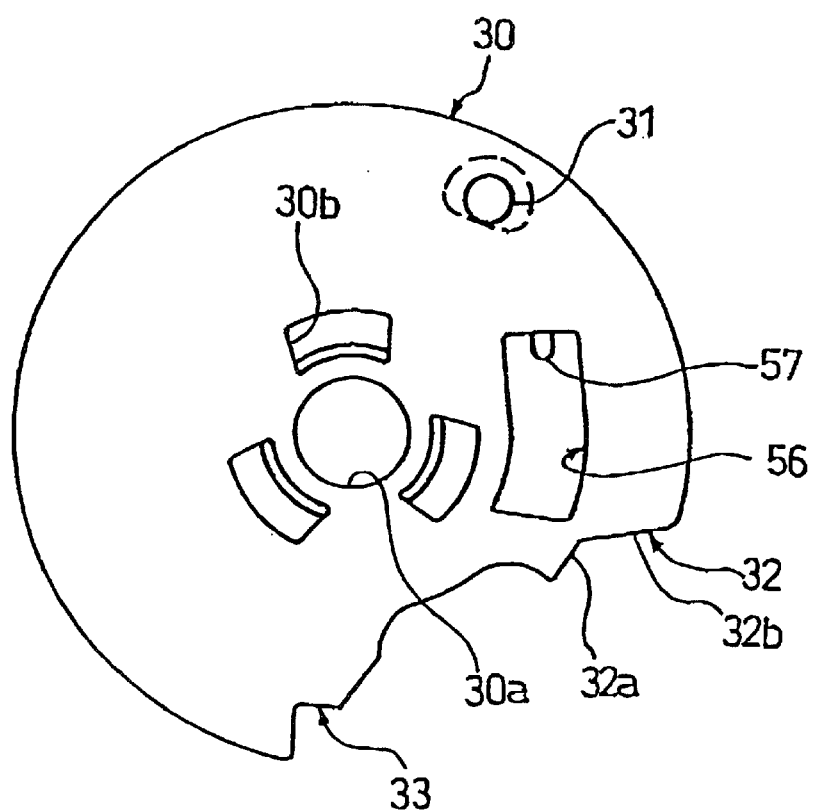
FIG. 18 is a diagram explaining an inertia plate 30.

Provided on the inner side face of the ratchet wheel 18 is a spring hook 21. The extension coil spring 36, the one end of which is hooked-by the hook 17c of the retaining plate 17, has its other end hooked by the coil hook 21. The extension coil spring 36 urges the rotation of the ratchet wheel 18 with respect to the reel 3 in the seatbelt protracting direction (in the direction of arrow X2). As shown in FIG. 17, the lock arm 26 includes a stopper pawl 26b capable of biting an inner teeth gear 34a of a gear case 34, and also an arm portion 26c for pressing the center portion of the linear sensor spring 25 in a longitudinal direction, whose both ends are supported by a pair of hooks 18d formed on the outer side face of the ratchet wheel 18.

Accordingly, the lock arm 26 bites the inner teeth gear 34a, thereby engaging with the stopper pawl 26b and constituting a stopper element for preventing the rotation of the ratchet wheel in the seatbelt protracting direction. By the urging force of the sensor spring 25, the stopper pawl 26b is pressed and urged toward the contacting portion 32 of the inertia plate 30. Furthermore, the ratchet wheel 18 corresponding to the rocking range of the arm portion 26c has an opening for the penetration of the arm portion 26c formed thereon, which is provided solely for ensuring the engagement of the arm portion 26c with the sensor spring 25.

As a cam face grinding and contacting the back 26d of the stopper pawl 26b of the lock arm 26, the contacting portion 32 is structured of a first cam face 32a not affecting the lock arm 26 by the rotation of the inertia plate 30, and a second cam face 32b for rocking the arm 26 in correspondence with the delay in thee rotation of the inertia plate 30 from the rotation of the reel 3 and causing the stopper pawl 26b to bite the inner teeth 34a.

The emergency locking mechanism being unlocked, the first cam face 32a contacts the back 26d of the lock arm 26, and the back 26d does not contact the second cam face 32b until the delay in the rotation of the inertia plate 30 from the rotation of the reel 3 exceeds a prescribed value. Regarding the length of the first cam face 32a, i.e., the quantity of the rotation of the inertia 30 in the state of the back 26d slidably contacting the first cam face 32a, if the rotation of the inertia plate 30 is delayed from the rotation of the reel 3 by the inertia force acting on the inertia plate 30 when the entire seatbelt is retracted, the first cam face 32a is set at a length to prevent the back 26d of the lock arm from reaching the second cam face 32b by such level of delay in the rotation.

Figure 21:
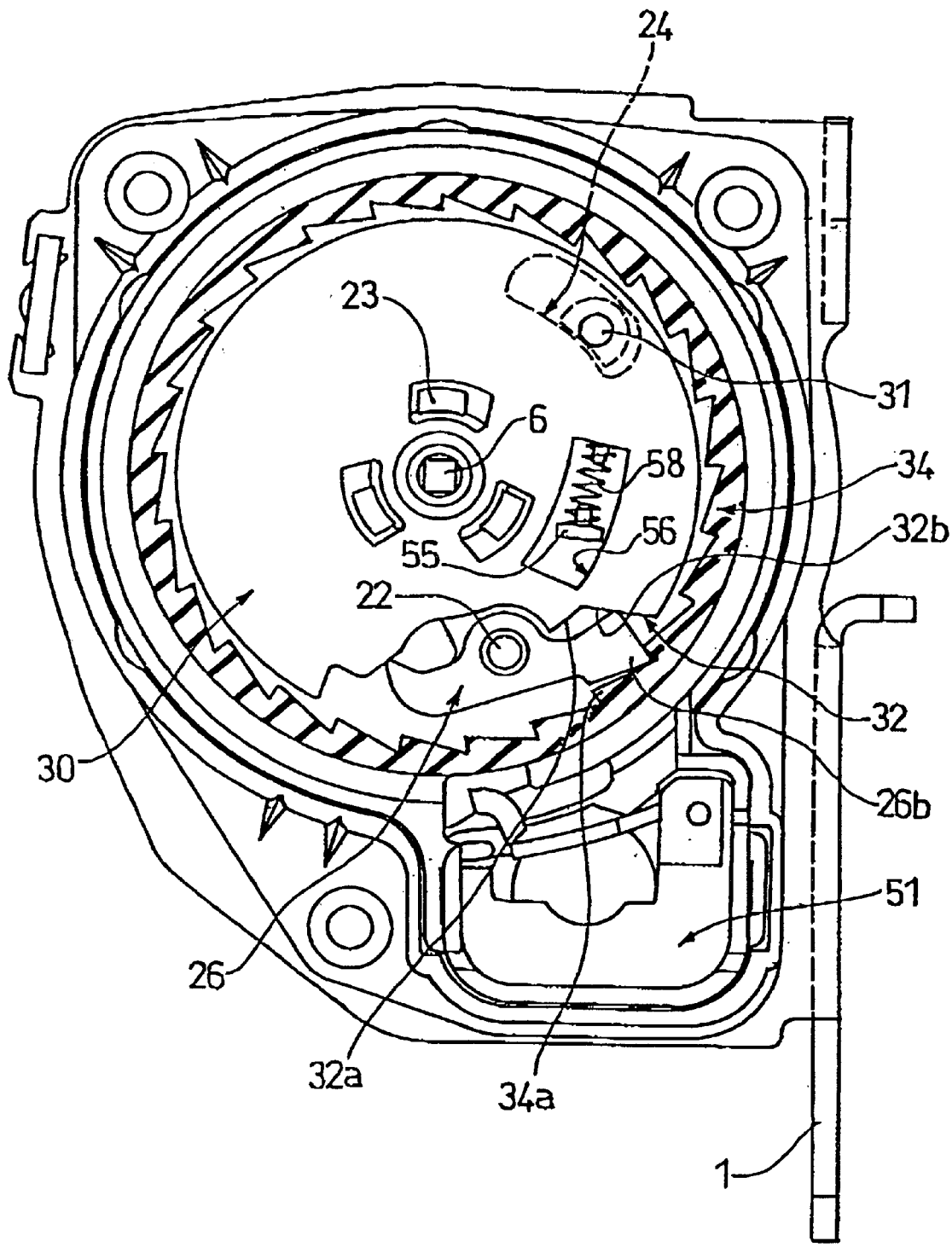
FIG. 21 is a diagram explaining the operation of a locking mechanism by the seatbelt acceleration.

Furthermore, the lock arm 26 according to the present embodiment includes a contacting pawl 26e at its rocking end located opposite to the stopper pawl 26b. Corresponding to the contacting pawl 26e, the inertia plate 30 includes a step 33 to which the contacting pawl 26e can contact. The step 33 is provided for enabling such contact of the contacting pawl 26e when the inertia plate 30 is at its initial position under an unlocked state, and thereby restricting the rotation and movement of the lock arm 26 in the locking direction. As shown in FIGS. 20 and 21, when the rotation of the inertia plate 30 is delayed more than a prescribed value and the back 26d of the lock arm 26 touches the second cam face 32b, the lock arm 26 can rock in the looking direction by the pressing effect of the second cam face 32b.

Furthermore, on the spindle 19 protruding from the inner side face of the ratchet wheel 18, a rocking lever 20 supported by an shaft hole 20a is rockably provided. A counterclockwise rotation of the rocking lever 20 is suitably restricted by the stopper protrusion 8 protruding from the sensor side end face of the reel 3. Furthermore, the rocking lever 20 is assembled between the reel 3 and the ratchet wheel 18, so that when the pressing protrusion 16d protruding from the sensor side face contacts an area between the spindle 19 and the stopper protrusion 8, the clockwise rotation of the rocking lever 20 is suitably restricted.

At the center portion of the gear case 34 provided outside the inertia plate 30, a shaft supporter 34b is provided via the spindle 6 to rotatably support the reel 3. A collar 6a of the spindle 6 contacts the bottom face of the shaft supporter 34b, which constitutes a surface for defining the axial direction of the reel 3. Furthermore, provided at the lower portion of the gear case 34 is a box-shaped housing 50 which houses the vehicle acceleration sensor 51 for sensing the acceleration of the vehicle.

The sensor cover 35 is provided outside the side plate 1a covering the gear case 34.

Next, the operation of the aforementioned seatbelt retractor is explained below. Foremost, as shown in FIG. 19, in a normal state, the ratchet wheel 18 is urged with respect to the reel in the seatbelt protracting direction by the urging force of the extension coil spring 36 hanging from a hook 17c of a plate 17, and the pole 16 having an engaging protrusion 16b which engages with a cam hole 18a is thereby urged in a direction to disengage from the inner gear teeth 2. Consequently, the reel 3 can rotate, and the seatbelt is freely protracted.

Thus, if the seatbelt acceleration sensor or the vehicle acceleration sensor 51 including the inertia plate 30 is activated upon an emergency such as a vehicle collision, a rotation of the ratchet wheel 18 in the seatbelt protracting direction is prevented either by the lock arm 26 or the sensor arm 53 which serve as stopper elements for preventing the rotation of the ratchet wheel 18 in the seatbelt protracting direction, and the locking element of the retractor is activated.

After the vehicle acceleration sensor 51 or the seatbelt acceleration sensor is activated and the seatbelt is protracted from the retractor, the rotation of the ratchet wheel 18 is delayed compared with the rotation of the reel 3, and the ratchet wheel 18 performs a relative rotation in the seatbelt winding direction (direction of arrow X1). Thus, the cam hole 18*a* of the ratchet wheel 18 displaces the engaging protrusion 16*b* on the pole 16 radially outward from the central axis of rotation. The pole 16 thereby rockably rotates around the spindle 7 in a direction (direction of arrow Y1 in FIG. 13) to engage with the inner gear teeth 2.

Furthermore, when the seatbelt is protracted from the retractor, the gear teeth 16*c* bites the inner engaging 2 and the operation is thereby completed. Under this condition, there is a gap between the rear end 16*e* of the pole 16 and the pressure receiving face 45 of the reel 3, while the rotation of the rocking lever 20 is restricted by both the stopper protrusion 8 of the pole 3 and the pressing protrusion 16*d* of the pole 16 with almost no recess.

The spindle 7 of the reel 3 loosely fits into the spindle hole 16*a* of the pole 16, such that the spindle hole 16*a* is rockably and rotatably supported, capable of making relative movements toward the reel 3 in a prescribed value. Therefore, if the seatbelt is protracted from the retractor, the pole 16 performs relative rotations with respect to the reel 3 around the rotational axis of the reel 3 until the rear end 16*e* contacts the pressure receiving face 45.

In such case, although the pressing protrusion 16*d* of the pole 16 is in an immobile position with respect to the side plate 1*a*, the stopper protrusion 8 of the reel 3 rotates in the seatbelt protracting direction (direction of arrow X2). As a result of this movement, the rocking lever 20 rockably rotates in the clockwise direction shown in FIG. 14 as the rocking end is pressed by the stopper protrusion 8, and is made to rockably rotate around the pressing protrusion 16*d* being the fulcrum of its rotation. When the rocking lever 20 rockably rotates in the clockwise direction in FIG. 14 around a contact point of the rocking lever 20 and the pressing protrusion 16*d*, the shaft hole 20*a* rotatably supported by the spindle 19 of the ratchet wheel 18 rotates in the seatbelt winding direction (direction of arrow X1) with respect to the central rotational axis of the reel 3. As a result, the ratchet wheel 18 rotates in the reverse direction with respect to the reel 3 in the seatbelt winding direction (in the direction of arrow X1).

Accordingly, even if the vehicle acceleration sensor 51 or the seatbelt acceleration sensor is activated and the locking element of the retractor is "locked" for preventing the rotation of the reel 3 in the seatbelt protracting direction, the ratchet wheel 18 which is prevented from rotating in the seatbelt protracting direction can be set "free" in order to disengage from the inner gear teeth 34*a* of the gear case 34 either the sensor arm 53 of the car acceleration sensor 51 or the lock, arm 26 of the seatbelt acceleration sensor.

When the pole 16 is locked, any larger tension acting on the seatbelt causes deformation of the supporting axis 34*b* of the gear case 34 and the portion supporting the axis 15*c* of the power transmission unit 15, and the reel 3 attempts to move upward. This can be avoided by the contacting face 3*a* and a groove 3*b* formed on the reel respectively contacting the inner gear teeth 2 and the gear teeth 62 formed on the side board 1*b* (see FIG. 13), and the tension acting on the seatbelt is received by these surfaces.

By the time the vehicle stops and the tension acting on the seatbelt is released, the engagement between the ratchet wheel 18 and the inner teeth gear 34*a* formed on the gear case 34 of the sensor arm 53 or the lock arm 26 has been released, and the urging force of the extension coil spring 36 makes the ratchet wheel 18 rotate with respect to the reel 3 in the direction of arrow X2, such that the cam hole 18*a* of the ratchet wheel 18 displaces the engaging protrusion 16*b* of the pole 16 to the rotational axis side of the reel 3. At this time, the tension acting on the seatbelt in the seatbelt protracting direction is released in the manner described above and the reel 3 is permitted to rotate in the seatbelt winding direction (direction of arrow X1). Accordingly, it the reel 3 rotates in the direction of arrow XI without the tip of the gear teeth 16*c* of the pole 16 involving with the tip of the inner gear teeth 2, then the pole 16 rockably rotates around the spindle 7 in a direction to disengage from the inner gear teeth 2, and the reel 3 is thereby unlocked and the seatbelt can be freely protracted.

Subsequently, under the seatbelt protracting state, the electric motor 110 winds the seatbelt, and if the full length of the seatbelt is rapidly wound in accordance with the torque of the power transmission device 15, the inertia plate 30 serving as an inertia element of the seatbelt acceleration sensor continues to rotate in the winding direction with respect to the reel 3 which has suddenly stopped rotating, such that the rotation of the inertia plate 30 proceeds in the winding direction with respect to the reel 3 and the rotation of the inertia plate 30 is delayed in respect to the protracting direction of the reel 3. However, the contacting portion 32 of the inertia plate 30, which makes the stopper pawl 26*b* of the lock arm 26 rock in a direction to engage with the inner gear teeth 34*a* of the gear case 34, is structured of two cam faces 32*a* and 32*b* for making the stopper pawl 26*b* rock toward the inner teeth gear 34*a* only after the delay in the rotation of the inertia plate 30 (in comparison with the rotation of the reel 3) has reached a prescribed value. Therefore, the stopper pawl 26*b* does not rock in a direction to engage with the inner teeth gear 34*a* until the delay in the rotation of the inertia plate 30 (in comparison with the rotation of the reel 3) has reached a prescribed value.

Figure 22:
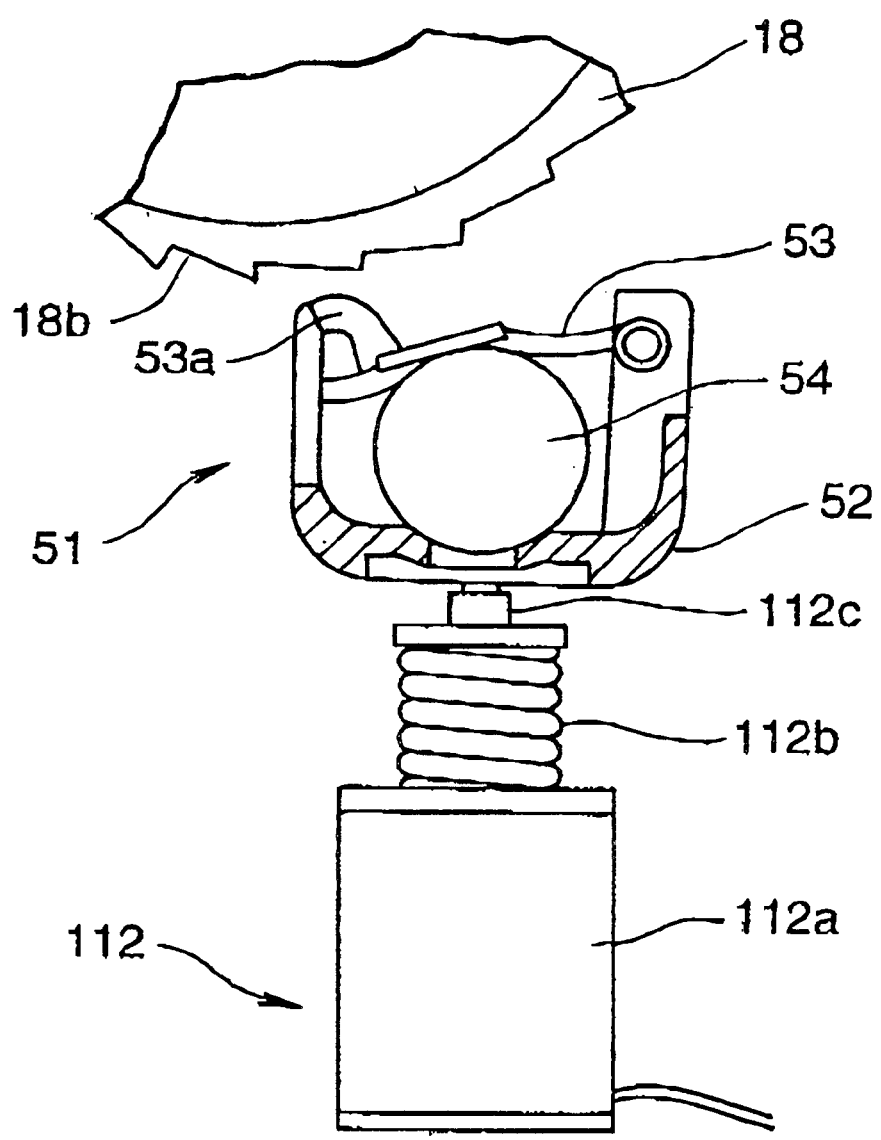
FIG. 22 is a diagram explaining the operation of an electromagnetic actuator (under an unlocked state)
Figure 23:
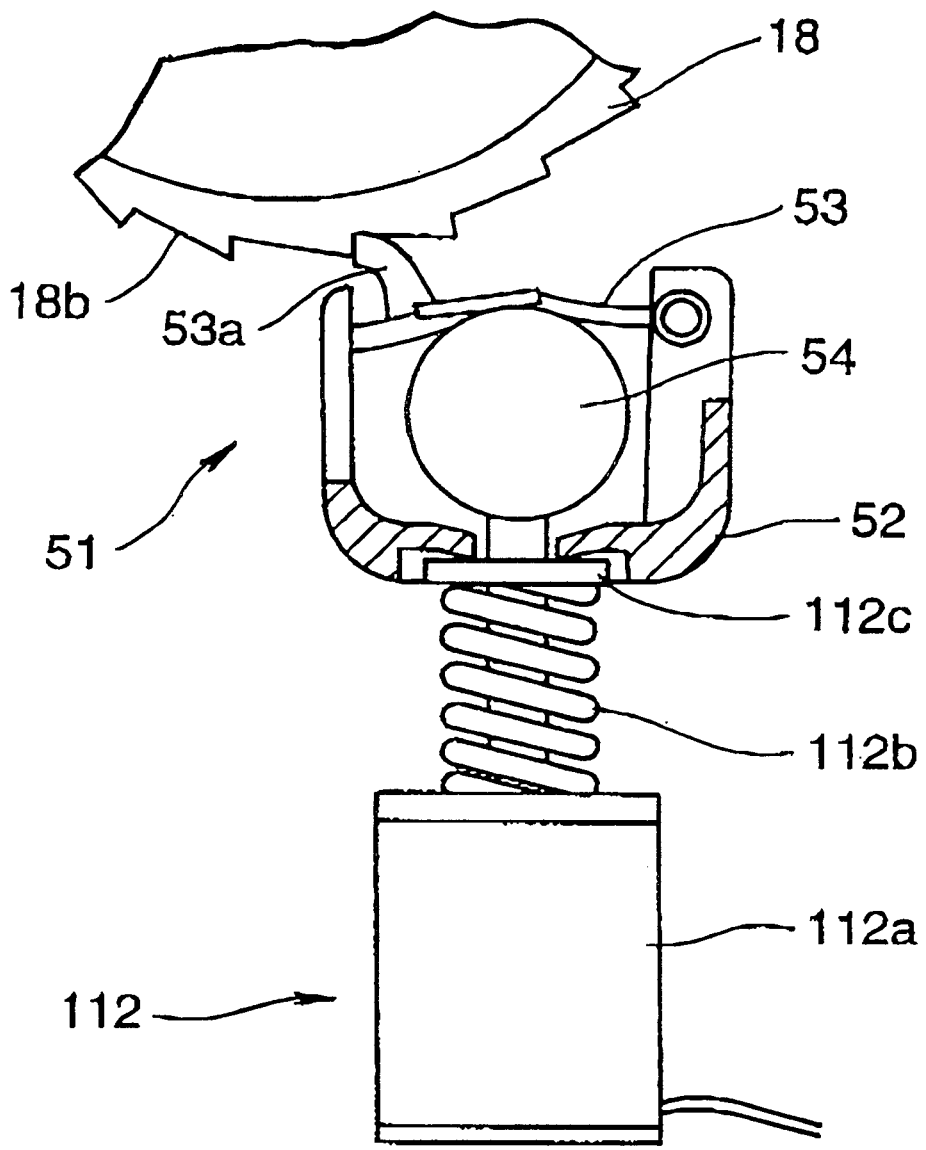
FIG. 23 is a diagram explaining the operation of an electromagnetic actuator (under a locked state)

The embodiment of the present invention has a structure explained above. The activated locking mechanism is further provided with an electric magnetic actuator 112 as shown in the lower part of FIG. 14. This actuator is required for the processing illustrated in FIG. 9 mentioned above. As shown in FIGS. 22 and 23, the electric magnetic actuator 112 is structured of a solenoid (excitation coil) 112*a*, a coil spring (elastic element) 112*b*, a collar plunger (magnetic core) 112*c*, etc. and is provided at the lower part of the vehicle acceleration sensor 51.

In a normal state, the solenoid 112*a* is excited under this condition, as shown in the Figures, the plunger 112*c* does not contact a ball weight 54 and therefore does not affect the locking mechanism 51. When a controller 200 releases the excitation of the solenoid 112*a* in order to lock the seatbelt (S30, etc.), the plunger 112*c* is raised by the urging force of the spring 112*b*. Through an opening formed on the bottom face of sensor cover 52, the tip of the plunger 112*c* pushes up the ball weight 54. When the ball weight is lifted up, the sensor arm moves upward in FIG. 22 and the engaging protrusion 53*a* engages with the ratchet teeth 18*b* of the ratchet wheel 18. Thus, the rotation of the ratchet wheel in the seatbelt protracting direction (direction of arrow X2 in FIG. 14) is prevented. When the seatbelt is protracted and the reel 3 is rotated in the seatbelt protracting direction, due to the difference in the rotation of the locked ratchet wheel 18 and the rotation of the reel 3, the pole 16 is displaced radially outward and engages with the inner gear teeth 2 of the frame 1*a*. The rotation of the reel 3 in the seatbelt protracting direction is thereby prevented.

According to this example, the locking operation is not conducted when the solenoid 112*a* is supplied with an excitation current. The locking operation takes place hen the excitation current is cut off. In other words, the locking mechanism can be activated by supplying low-level activation signals. Therefore, the seatbelt can be locked when the power source of the seatbelt device is cut off.

Figure 24:
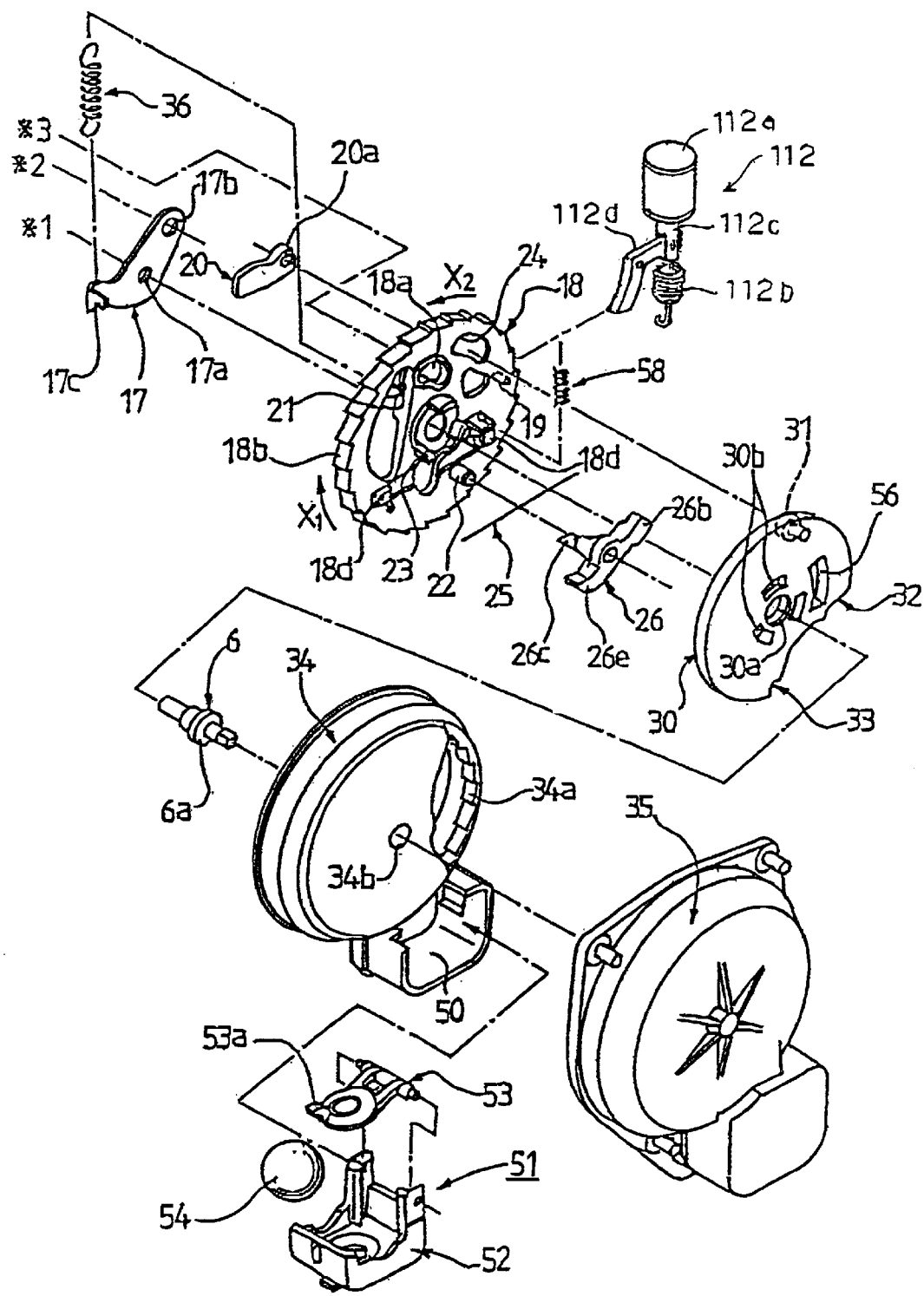
FIG. 24 is a diagram explaining another example of an electromagnetic actuator.

FIG. 24 is a diagram showing another example of a structure of an electromagnetic actuator 112. According to this example, the electromagnetic actuator is structured of: the solenoid 112a; the plunger 112c; a lever 112d substantially in L-shape, engaged with the plunger 112c at one end and having its center portion rotatably supported; and a coil spring urging the lever 112d in the clockwise direction in FIG. 24. When the pawl of the lever 112d is displaced and touches a tooth face 18b of the ratchet wheel 18, the rotation of the ratchet wheel 18 is prevented and the locking mechanism is operated by the pole 16 and the frame of the inner teeth 2.

In a normal state where the solenoid 112a is supplied with an excitation current from the controller 200, the solenoid 112a resists to the coil spring 112b and draws the plunger 112c, whereby the other end of the pawl of the lever 112d is separated from the ratchet wheel 18. Accordingly, the locking mechanism is not activated.

Furthermore, in order to lock the seatbelt, the supply of the excitation current from the controller 200 is cut (at S46, etc.) The coil spring 112b pulls out the plunger 112c downward in the Figure by its urging force, thereby rotating the lever 112d. As a consequence, the pawl at the other end of the lever 112d engages with the teeth 18b of the ratchet wheel 18 and the rotation of the ratchet wheel in the seatbelt protracting direction is prevented. When the seatbelt is protracted and the reel 3 rotates in the direction of the protraction, the difference in the rotations of the engaged ratchet wheel 18 and the reel 3 displaces the pole 16 radially outward and the pole 16 engages with the inner teeth 2 formed on the frame 1a. Thus, the rotation of the reel 3 in the seatbelt protracting direction is prevented, and the locking is completed.

FIGS. 25 through 29 show examples of structures of other seatbelt devices employing the present invention. In each drawing, components corresponding to those of FIG. 1 are shown with the same reference numerals.

Figure 25:
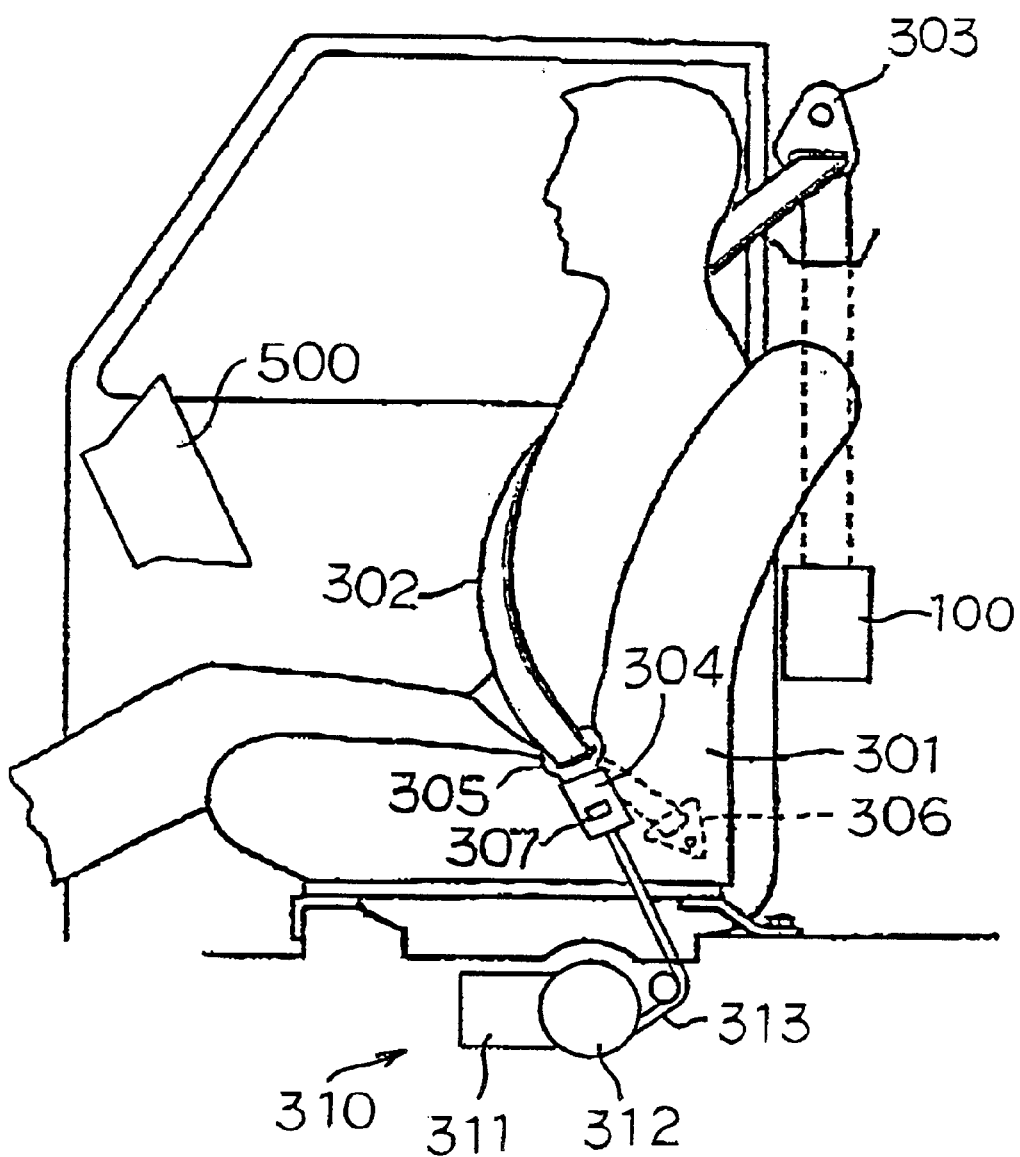
FIG. 25 is a diagram explaining an example where an electric winch serving as a seatbelt tension modifier is fixed to the buckle side.

FIG. 25 shows another example of a seatbelt device employing the present invention. In this example, an electric winch 310 comprising a motor 311 and a reel 312 for winding the wire 313 connected to the buckle 304 is provided as a tension modifier for winding or protracting the seatbelt on the buckle 304 side. The wire is protracted or wound by a normal or a reverse rotation of the motor 311. Instead of driving the motor 110, the controller 200 drives the motor 311 of the winch 310 so that the slack in the seatbelt 302 is removed. Here also, the tension of the seatbelt can be estimated by detecting the current value of the motor 311. With this structure, it is preferred that the seatbelt retractor 100 has a compulsory locking mechanism and a pretensioner, but the seatbelt retractor need not be electric. The anchor 306 for securing one end of the seatbelt 302 can be fixed to the seat 301. By doing so, the protracted length of the seatbelt 302 is made shorter and the slack in the seatbelt can be removed faster.

Figure 26:
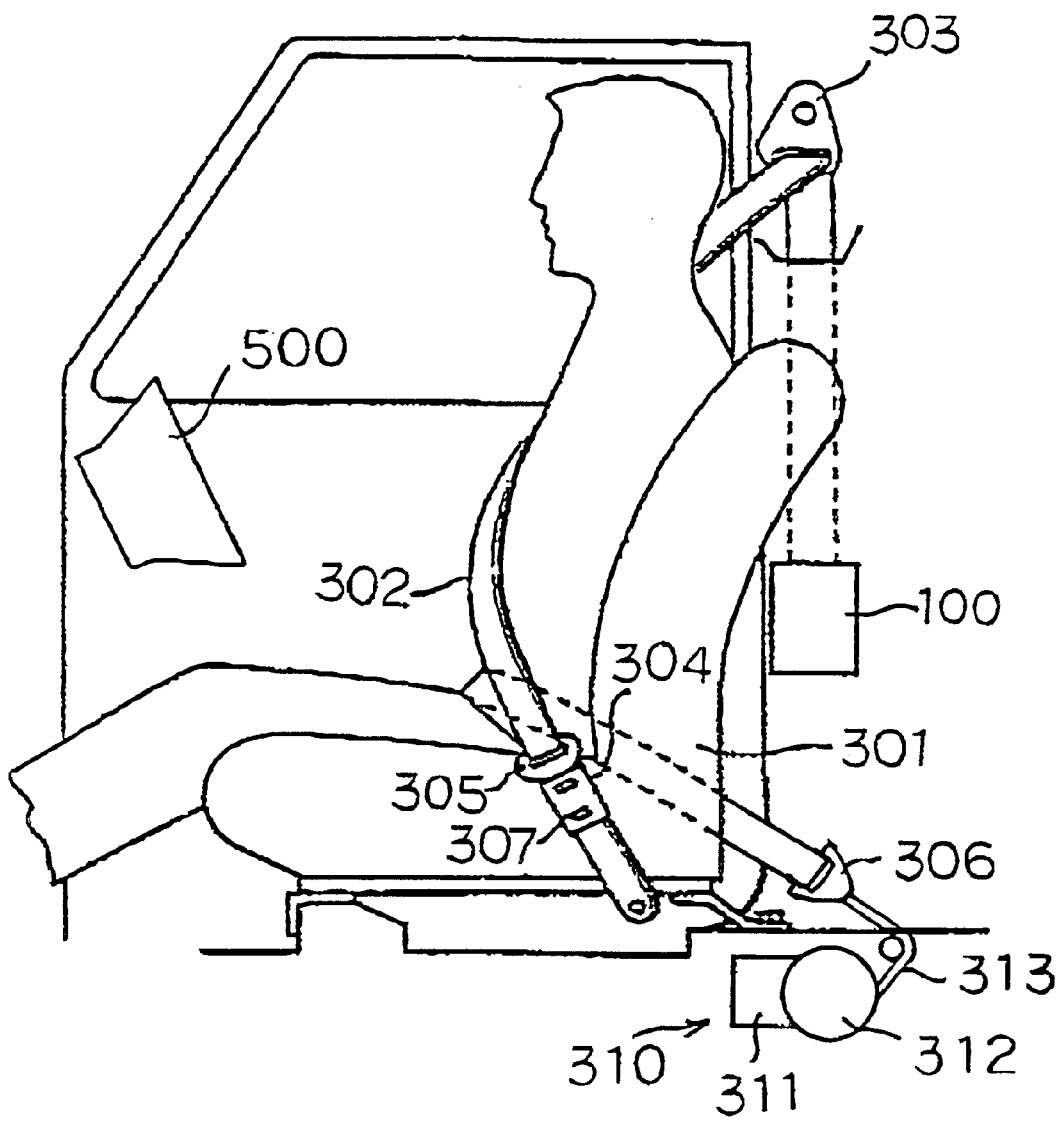
FIG. 26 is a diagram explaining an example where an electric winch serving as a seatbelt tension modifier fixed to the seatbelt end.

FIG. 26 shows an example of another seatbelt device employing the present invention. According to this example, the tension modifier for removing any slack in the seatbelt is provided other side of the anchor 306 (wrap belt fixing portion) for securing one end of the seatbelt 302. Similar to the example above, a tension modifier may be structured of a motor 311 and an electric winch 310 having a reel 312 for winding the wire 313 connected to the buckle. As a possible variant, a tension modifier may be structured of a screw shaft which is rotated and driven by the motor and the nut which performs reciprocating motion along the screw shaft.

Figure 27:
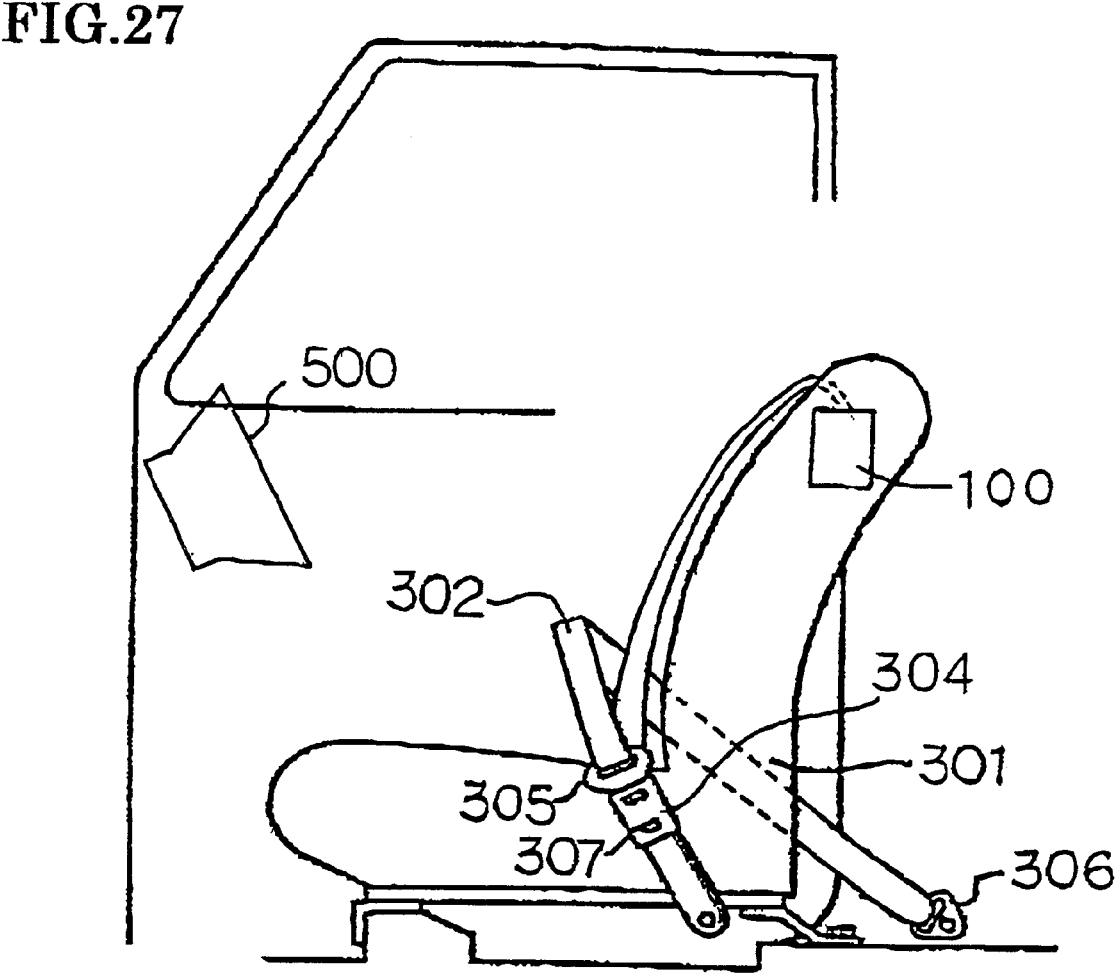
FIG. 27 is a diagram explaining an example of a seat provided with a seatbelt retractor.

According to the example shown in FIG. 27, the seatbelt retractor 100 is fixed not to the bottom of the center pillar of the vehicle but to the seat 301. The present invention can also have such structure.

Figure 28:
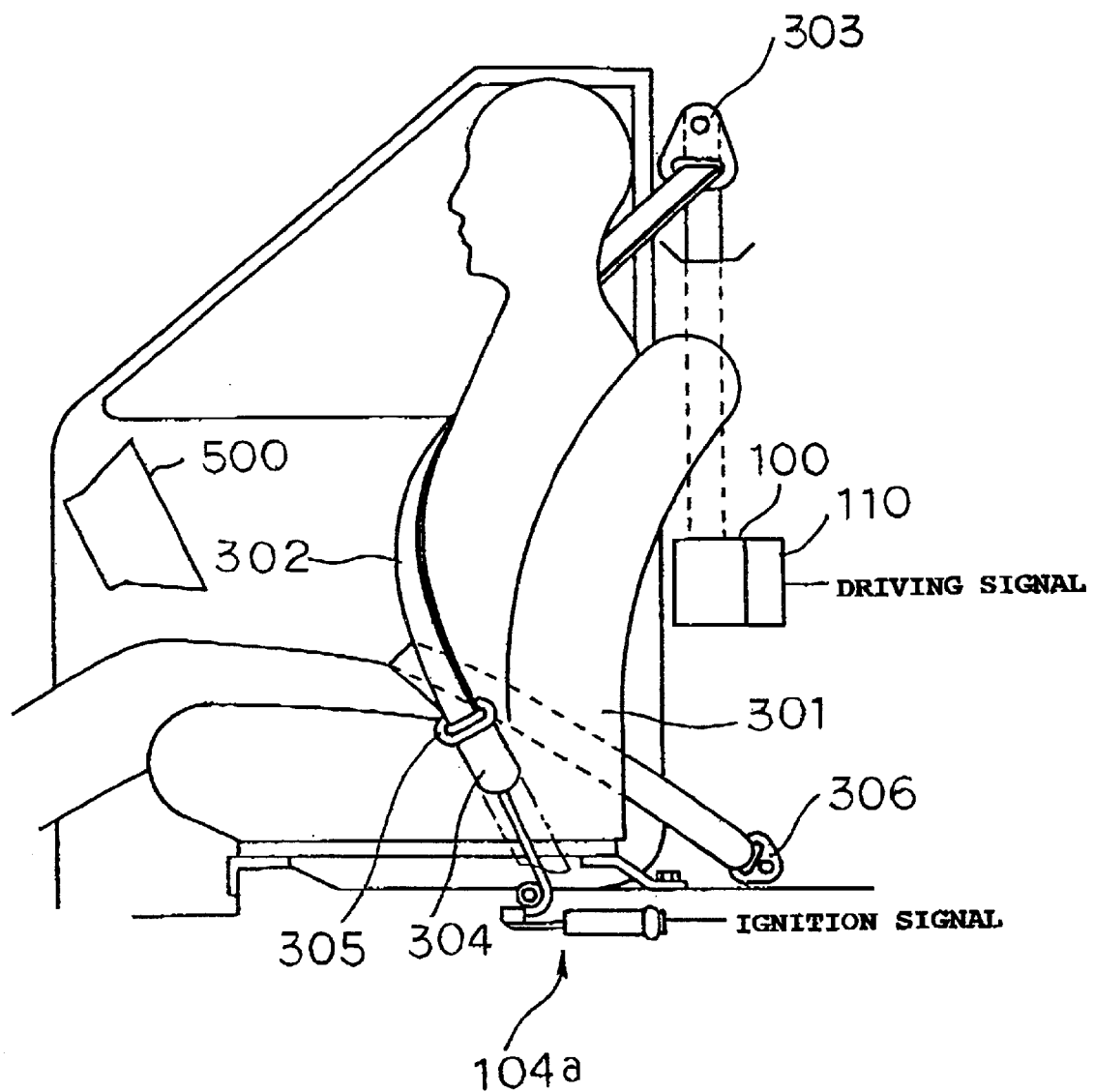
FIG. 28 is a diagram explaining a case where a pretentioner is provided on the buckle side.

The example shown in FIG. 28 is structured of an electric retractor and a pretensioner 104a provided on the buckle side.

Figure 29:
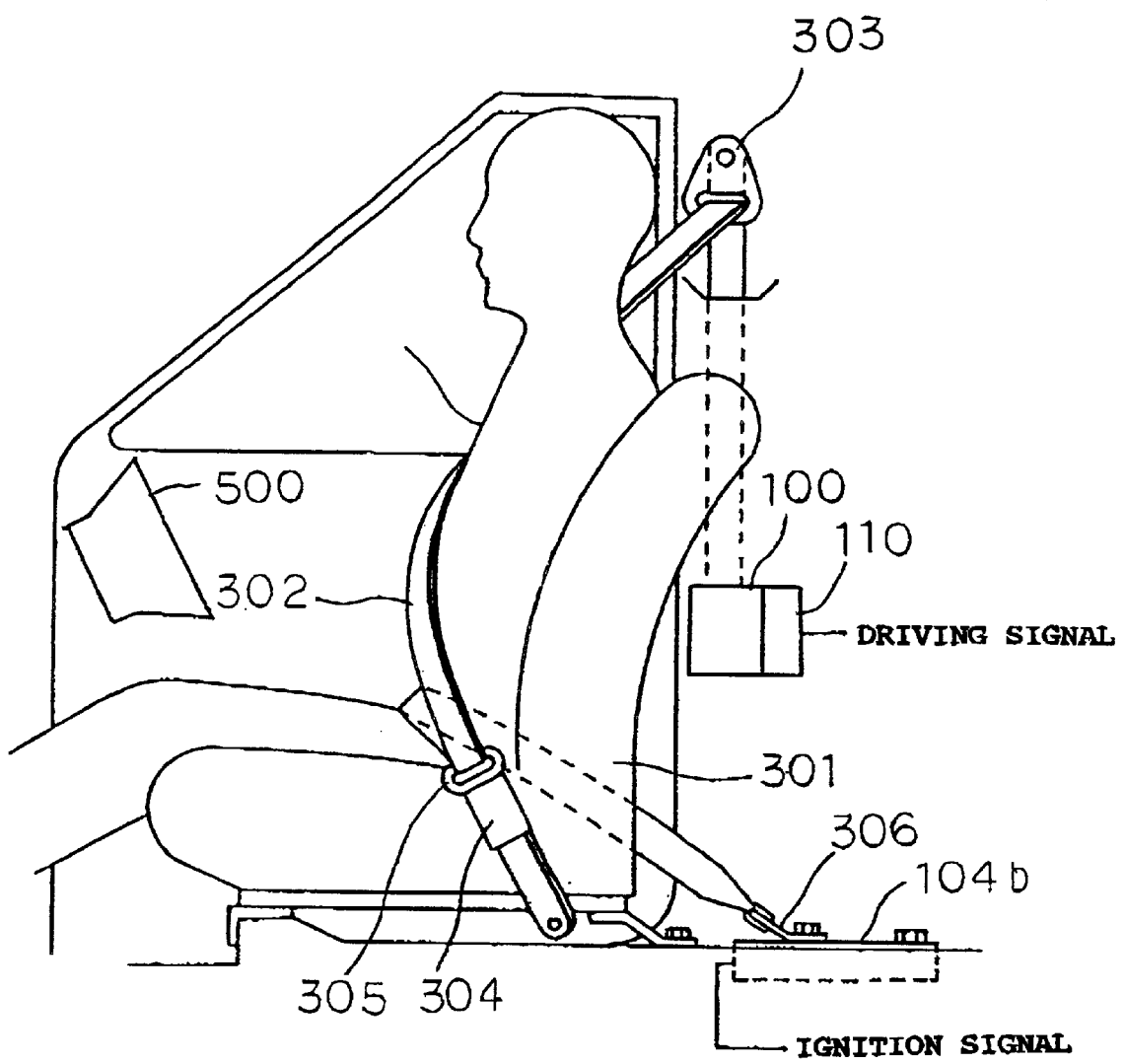
FIG. 29 is a diagram explaining a case where a pretentioner is provided at the seatbelt end.

The example shown in FIG. 29 is structured of an electric retractor and a pretensioner 104b provided on the side of the anchor 306 for securing one end of the seatbelt 302.

Furthermore, a pretensioner can be incorporated in the electric winch 310 shown in FIGS. 25 and 26.

Although the seatbelt device according to the above-described embodiment has an electric motor as a first tension modifier and a powder pretensioner, which is activated by an explosive system, as a second tension modifier, both tension modifiers may have electric motors. Furthermore, a spring may be used as a power source. Either or both of the first and second tension modifiers may be mounted on the seatbelt retractor, and either or both of the first and second tension modifiers may be mounted on a component other than the seatbelt retractor. In such case, the tension modifier(s) may be mounted on the buckle side or on the wrap belt securing portion side.

Furthermore, since the vehicle collision detector activating the pretensioner is operated when the output of the deployment (operation) of the airbag is detected, the cost of the device is further reduced.

As explained above, according to the seatbelt device of the present invention, the slack in the seatbelt is removed by the first tension modifier prior to a collision, and the occupant is secured to the seat by the second tension modifier at a higher tension concurrently with the deployment of the airbag. Therefore, it is possible to save the occupant from being hit by the airbag.

What is claimed is:

1. A method to control the activation of a seatbelt device comprising the steps of:

detecting by a seatbelt fastening detector that a tongue plate, through which a seatbelt for securing an occupant to a seat passes, has been engaged with a buckle;

predicting a collision of a vehicle and outputting a prediction signal before the collision by a collision predictor;

detecting the collision of the vehicle and outputting a collision detection signal by a collision detector;

activating a first tension modifier by a controller in response to said prediction signal and enhancing a tension of the seatbelt by activation of the first tension modifier; and activating an airbag device and a second tension modifier by the controller in response to said collision detection signal and further enhancing said tension of the seatbelt by activation of the second tension modifier;

wherein the first tension modifier is activated prior to the second tension modifier being activated; and wherein said tension of the seatbelt increases continuously from a time associated with said collision prediction signal to a time associated with said collision detection signal.

2. The method according to claim 1, wherein said first tension modifier is a device for winding or protracting the seatbelt by a motor power source, and said second tension modifier is a device for instantly retracting the seatbelt by a power source of powder combustion gas.

3. The method according to claim 1, wherein a seatbelt retractor is fixed to a vehicle body or said seat for winding said seatbelt, and
wherein said first tension modifier and said second tension modifier are provided to said seatbelt retractor.

4. The method according to claim 1, wherein a seatbelt retractor is fixed to a vehicle body or said seat for winding said seatbelt, and
wherein said first tension modifier is provided to said seatbelt retractor and said second tension modifier is provided to a buckle portion.

5. The method according to claim 1, wherein a seatbelt retractor is fixed to a vehicle body or said seat for winding said seatbelt, and
wherein said first tension modifier is provided to a buckle portion and said second tension modifier is provided to said seatbelt retractor, and said seatbelt retractor has a seatbelt locking mechanism for locking a protraction of said seatbelt when said first tension modifier is activated.

6. The method according to claim 1,
wherein said first tension modifier is provided to a seatbelt retractor winding one end of said seatbelt, and said second tension modifier is provided to a wrap belt fixing portion fixing the other end of the seatbelt to a vehicle body or said seat.

7. The method according to claim 1,
wherein said second tension modifier is provided to a seatbelt retractor winding one end of said seatbelt, said seatbelt retractor has a seatbelt locking mechanism for locking a protraction of said seatbelt when the first tension modifier is activated, and said first tension modifier is provided to a wrap belt fixing portion fixing the other end of the seatbelt to a vehicle body or said seat.

8. The method according to claim 1,
wherein said first tension modifier is provided to a buckle portion, and said second tension modifier is provided to a wrap belt fixing portion fixing an end of the seatbelt to a vehicle body or said seat.

9. The method according to claim 1,
wherein said first tension modifier is provided to a wrap belt fixing portion fixing an end of the seatbelt to a vehicle body or said seat, said second tension modifier is provided to a buckle portion, and a seatbelt retractor fixed to said vehicle body or said seat for winding said seatbelt has a seatbelt locking mechanism for locking a protraction of said seatbelt in response to an ordering signal.

10. The method according to claim 1,
wherein said first tension modifier and said second tension modifier are provided to a wrap belt fixing portion fixing an end of the seatbelt to a vehicle body or said seat, and a seatbelt retractor fixed to said vehicle body or said seat for winding said seatbelt has a seatbelt locking mechanism for locking a protraction of said seatbelt in response to an ordering signal.

11. The method according to claim 1, wherein said first tension modifier increases said tension of the seatbelt at least until said time associated with said collision detection signal.

12. The method according to claim 11, wherein said first tension modifier increases said tension of the seatbelt after said time associated with said collision detection signal.

13. A method to control the activation of a seatbelt device comprising the steps of:
detecting by a seatbelt fastening detector that a tongue plate, through which a seatbelt for securing an occupant to a seat passes, has been engaged with a buckle;
predicting a collision of a vehicle and outputting a prediction signal before the collision by a collision predictor;
detecting the collision of the vehicle and outputting a collision detection signal by a collision detector;
activating a first tension modifier by a controller in response to said prediction signal and enhancing a tension of the seatbelt by activation of the first tension modifier; and
activating an airbag device and a second tension modifier by the controller in response to said collision detection signal and further enhancing said tension of the seatbelt by activation of the second tension modifier;
wherein the first tension modifier is activated prior to the second tension modifier being activated; and
wherein both said first tension modifier and said second tension modifier increase said tension of the seatbelt at a time period after a time associated with said collision detection signal.

14. The method according to claim 13, wherein said first tension modifier is a device for winding or protracting the seatbelt by a motor power source, and said second tension modifier is a device for instantly retracting the seatbelt by a power source of powder combustion gas.

15. The method according to claim 13, wherein a seatbelt retractor is fixed to a vehicle body or said seat for winding said seatbelt, and
wherein said first tension modifier and said second tension modifier are provided to said seatbelt retractor.

16. The method according to claim 13, wherein a seatbelt retractor is fixed to a vehicle body or said seat for winding said seatbelt, and
wherein said first tension modifier is provided to said seatbelt retractor and said second tension modifier is provided to a buckle portion.

17. The method according to claim 13, wherein a seatbelt retractor is fixed to a vehicle body or said seat for winding said seatbelt, and
wherein said first tension modifier is provided to a buckle portion and said second tension modifier is provided to said seatbelt retractor, and said seatbelt retractor has a seatbelt locking mechanism for locking a protraction of said seatbelt when said first tension modifier is activated.

18. The method according to claim 13,
wherein said first tension modifier is provided to a seatbelt retractor winding one end of said seatbelt, and said second tension modifier is provided to a wrap belt fixing portion fixing the other end of the seatbelt to a vehicle body or said seat.

19. The method according to claim 13,
wherein said second tension modifier is provided to a seatbelt retractor winding one end of said seatbelt, said seatbelt retractor has a seatbelt locking mechanism for locking a protraction of said seatbelt when the first tension modifier is activated, and said first tension modifier is provided to a wrap belt fixing portion fixing the other end of the seatbelt to a vehicle body or said seat.

20. The method according to claim 13,
wherein said first tension modifier is provided to a buckle portion, and said second tension modifier is provided to a wrap belt fixing portion fixing an end of the seatbelt to a vehicle body or said seat.

21. The method according to claim 13,
wherein said first tension modifier is provided to a wrap belt fixing portion fixing an end of the seatbelt to a vehicle body or said seat, said second tension modifier is provided to a buckle portion, and a seatbelt retractor fixed to said vehicle body or said seat for winding said seatbelt has a seatbelt locking mechanism for locking a protraction of said seatbelt in response to an ordering signal.

22. The method according to claim 13,
wherein said first tension modifier and said second tension modifier are provided to a wrap belt fixing portion fixing an end of the seatbelt to a vehicle body or said seat, and a seatbelt retractor fixed to said vehicle body or said seat for winding said seatbelt has a seatbelt locking mechanism for locking a protraction of said seatbelt in response to an ordering signal.

23. The method according to claim 13, wherein said first tension modifier increases said tension of the seatbelt at least until said time associated with said collision detection signal.

* * * * *